United States Patent
Nakashima et al.

(10) Patent No.: US 11,337,238 B2
(45) Date of Patent: May 17, 2022

(54) TERMINAL APPARATUS AND COMMUNICATION METHOD

(71) Applicants: Sharp Kabushiki Kaisha, Sakai (JP); FG Innovation Company Limited, Tuen Mun (HK)

(72) Inventors: Daiichiroh Nakashima, Sakai (JP); Tomoki Yoshimura, Sakai (JP); Shouichi Suzuki, Sakai (JP); Liqing Liu, Sakai (JP); Taewoo Lee, Sakai (JP); Wataru Ohuchi, Sakai (JP)

(73) Assignees: SHARP KABUSHIKI KAISHA, Sakai (JP); FG INNOVATION COMPANY LIMITED, New Territories (HK)

( * ) Notice: Subject to any disclaimer, the term of this patent is extended or adjusted under 35 U.S.C. 154(b) by 114 days.

(21) Appl. No.: 16/644,189

(22) PCT Filed: Aug. 22, 2018

(86) PCT No.: PCT/JP2018/031011
§ 371 (c)(1),
(2) Date: Mar. 4, 2020

(87) PCT Pub. No.: WO2019/054144
PCT Pub. Date: Mar. 21, 2019

(65) Prior Publication Data
US 2020/0236699 A1    Jul. 23, 2020

(30) Foreign Application Priority Data
Sep. 15, 2017 (JP) .............................. JP2017-177646

(51) Int. Cl.
*H04W 72/04* (2009.01)
*H04W 72/12* (2009.01)

(52) U.S. Cl.
CPC ............... *H04W 72/1273* (2013.01); *H04W 72/1289* (2013.01)

(58) Field of Classification Search
CPC ......... H04W 72/1273; H04W 72/1289; H04W 72/042; H04W 72/0446; H04L 5/001;
(Continued)

(56) References Cited

U.S. PATENT DOCUMENTS

2013/0230017 A1* 9/2013 Papasakellariou ........................... H04W 72/0406
370/330
2013/0242906 A1* 9/2013 Li ........................ H04L 5/0053
370/329
(Continued)

FOREIGN PATENT DOCUMENTS

EP    2 512 051 A2    10/2012
EP    3 247 061 A1    11/2017
(Continued)

OTHER PUBLICATIONS

Samsung, "Search Space Design", 3GPP TSG RAN WG1 Meeting #90, R1-1713613, Aug. 21-25, 2017, 6 pages; (Year: 2017).*
(Continued)

*Primary Examiner* — Lan-Huong Truong
(74) *Attorney, Agent, or Firm* — Keating & Bennett, LLP

(57) ABSTRACT

The present invention is provided with: a radio resource control layer processing unit (16) configured to configure the number of PDCCH candidates configured in a dedicated control resource set, based on RRC signaling; a receiver (10) configured to monitor the multiple PDCCH candidates in the dedicated control resource set; and a decoding unit configured to decode the PDCCH candidates. a first number of the PDCCH candidates are monitored in the dedicated control resource set in a time period in which a common control resource set is not configured, a second number of the
(Continued)

(a) Localized resource    (b) Distributed resource

PDCCH candidates are monitored in the dedicated control resource set in a time period in which the common control resource set is configured, and a third number of the PDCCH candidates are monitored in the common control resource set. The sum of the second number and the third number is equal to the first number.

5 Claims, 13 Drawing Sheets

(58) Field of Classification Search
CPC ............... H04L 5/0094; H04L 5/0007; H04L 5/0053; H04L 27/26
See application file for complete search history.

(56) References Cited

U.S. PATENT DOCUMENTS

| | | | |
|---|---|---|---|
| 2014/0293942 | A1 | 10/2014 | Kang et al. |
| 2014/0301330 | A1 | 10/2014 | Lee et al. |
| 2015/0296542 | A1 | 10/2015 | Heo et al. |
| 2018/0054800 | A1* | 2/2018 | Yeo ..................... H04W 72/08 |
| 2018/0309560 | A1 | 10/2018 | Tang |

FOREIGN PATENT DOCUMENTS

| | | |
|---|---|---|
| EP | 3 661 239 A1 | 6/2020 |
| WO | 2016/114563 A1 | 7/2016 |

OTHER PUBLICATIONS

Tang, "Search spaces in a wireless communication system", U.S. Appl. No. 62/488,070, filed Apr. 21, 2017, 57 pages.
Intel Corporation, "General aspects for NR search space", 3GPP TSG RAN WG1 Meeting #88, R1-1702223, Feb. 13-17, 2017, pp. 1-5.
ZTE, "PDCCH blind decoding and search space on SCC", 3GPP TSG-RAN WG1 #61bis, R1-103578, Jun. 28-Jul. 2, 2010, 2 pages.
Qualcomm Incorporated, "LTE/NR UE capability dependency and coordination", 3GPP TSG-RAN WG2 Meeting #99, R2-1707835, Aug. 21-25, 2017, 45 pages.
Qualcomm Incorporated, "Draft CR on limiting the maximum number of PDCCH decoding candidates for LAA", 3GPP TSG-RAN Meeting #88, R1-1702519, Feb. 13-17, 2017, 5 pages.
LG Electronics, "Discussion on CORESET configuration", 3GPP TSG RAN WG1 NR Ad-Hoc#2, R1-1710305, Jun. 27-30, 2017, pp. 1-7.
Official Communication issued in International Patent Application No. PCT/JP2018/031011, dated Oct. 9, 2018.
NTT Docomo, "New SID Proposal: Study on New Radio Access Technology", 3GPP TSG RAN Meeting #71, RP-160671, Mar. 7-10, 2016, 8 pages.
Samsung, "Search Space Design", 3GPP TSG RAN WG1 Meeting #90, R1-1713613, Aug. 21-25, 2017, 6 pages.
ZTE, "SS Splitting among Different CORESETs and Blind Decoding", 3GPP TSG RAN WG1 Meeting #89, R1-1707161, May 15-19, 2017, 4 pages.

* cited by examiner (a) Time first mapping     (b) Frequency first mapping

TERMINAL APPARATUS AND COMMUNICATION METHOD

TECHNICAL FIELD

An aspect of the present invention relates to a terminal apparatus and a communication method.

BACKGROUND ART

In the 3rd Generation Partnership Project (3GPP), a radio access method and a radio network for cellular mobile communications (hereinafter referred to as "Long Term Evolution (LTE)" or "Evolved Universal Terrestrial Radio Access (EUTRA)") have been standardized. In LTE, a base station apparatus is also referred to as an evolved NodeB (eNodeB), and a terminal apparatus is also referred to as User Equipment (UE). LTE is a cellular communication system in which multiple areas are deployed in a cellular structure, with each of the multiple areas being covered by a base station apparatus. A single base station apparatus may manage multiple cells.

In the 3GPP, for proposal to International Mobile Telecommunication (IMT)-2020, which is a standard for next-generation mobile communication system developed by the International Telecommunications Union (ITU), a next-generation standard (New Radio (NR)) has been studied (NPL 1). The NR has been requested to meet requirements assuming three scenarios: enhanced Mobile BroadBand (eMBB), massive Machine Type Communication (mMTC), and Ultra Reliable and Low Latency Communication (URLLC) in a single technology framework.

CITATION LIST

Non Patent Literature

NPL 1: "New SID proposal: Study on New Radio Access Technology," RP-160671, NTT docomo, 3GPP TSG RAN Meeting #71, Goteborg, Sweden, 7-10 Mar. 2016.

SUMMARY OF INVENTION

Technical Problem

The present invention provides a terminal apparatus capable of efficiently performing downlink reception, a communication method used for the terminal apparatus, a base station apparatus capable of efficiently performing downlink transmission, and a communication method used for the base station apparatus.

Solution to Problem (1) A first aspect of the present invention is a terminal apparatus including: a receiver configured to receive higher layer signaling including the number of PDCCH candidates configured for a first set; and a processing unit configured to adjust the number of PDCCH candidates to be monitored in the first set in a slot, based on the number of PDCCH candidates to be monitored in a second set in the slot, and an upper limit value of the numbers of PDCCH candidates in the slot.

(2) According to a second aspect of the present invention, in the first aspect, the number of the PDCCH candidates to be monitored in the second set is less than the upper limit value of the number of the PDCCH candidates.

(3) According to a third aspect of the present invention, in the first aspect, the first set is configured to be dedicated to the terminal apparatus, the second set is configured to be common to a plurality of the terminal apparatuses, and the first set and the second set are search spaces configured to include multiple PDCCH candidates.

(4) A fourth aspect of the present invention is a communication method for a terminal apparatus including the steps of: receiving higher layer signaling including the number of PDCCH candidates configured for a first set; and adjusting the number of PDCCH candidates to be monitored in the first set in a slot, based on the number of PDCCH candidates to be monitored in a second set in the slot, and an upper limit value of the number of PDCCH candidates in the slot.

Advantageous Effects of Invention

According to the present invention, the terminal apparatus can efficiently perform downlink reception. The base station apparatus can efficiently perform downlink transmission.

DESCRIPTION OF EMBODIMENTS

Embodiments of the present invention will be described below.

Figure 1:
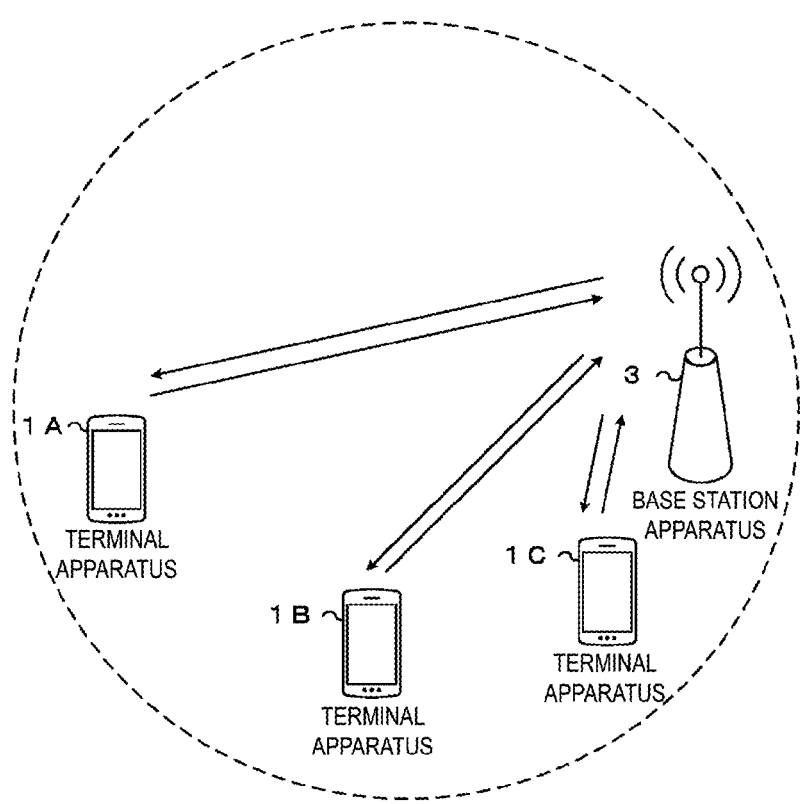
FIG. 1 is a conceptual diagram of a radio communication system according to one aspect of the present embodiment.

FIG. 1 is a conceptual diagram of a radio communication system according to one aspect of the present embodiment. In FIG. 1, the radio communication system includes terminal apparatuses 1A to 1C and a base station apparatus 3 (gNB). Hereinafter, the terminal apparatuses 1A to 1C are also referred to as a terminal apparatus 1 (UE).

Hereinafter, various radio parameters related to communications between the terminal apparatus 1 and the base station apparatus 3 will be described. Here, at least some of the radio parameters (for example, Subcarrier Spacing (SCS)) are also referred to as Numerology. The radio parameters include at least some of the subcarrier spacing, a length of an OFDM symbol, a length of a subframe, a length of a slot, or a length of a mini-slot.

The subcarrier spacing may be classified into two: reference subcarrier spacing (Reference SCS, Reference Numerology) and subcarrier spacing (Actual SCS, Actual Numerology) for a communication scheme used for the actual radio communications. The reference subcarrier spacing may be used to determine at least some of the radio parameters. For example, the reference subcarrier spacing is used to configure the length of the subframe. Here, the reference subcarrier spacing is, for example, 15 kHz.

The subcarrier spacing used for the actual radio communications is one of the radio parameters for a communication scheme (for example, Orthogonal Frequency Division Multiplex (OFDM), Orthogonal Frequency Division Multiple Access (OFDMA), Single Carrier-Frequency Division Multiple Access (SC-FDMA), Discrete Fourier Transform-spread-OFDM (DFT-s-OFDM)) used for radio communications between the terminal apparatus 1 and the base station apparatus 3. Hereinafter, the reference subcarrier spacing is also referred to as first subcarrier spacing. The subcarrier spacing used for the actual radio communications is also referred to as second subcarrier spacing.

Figure 2:
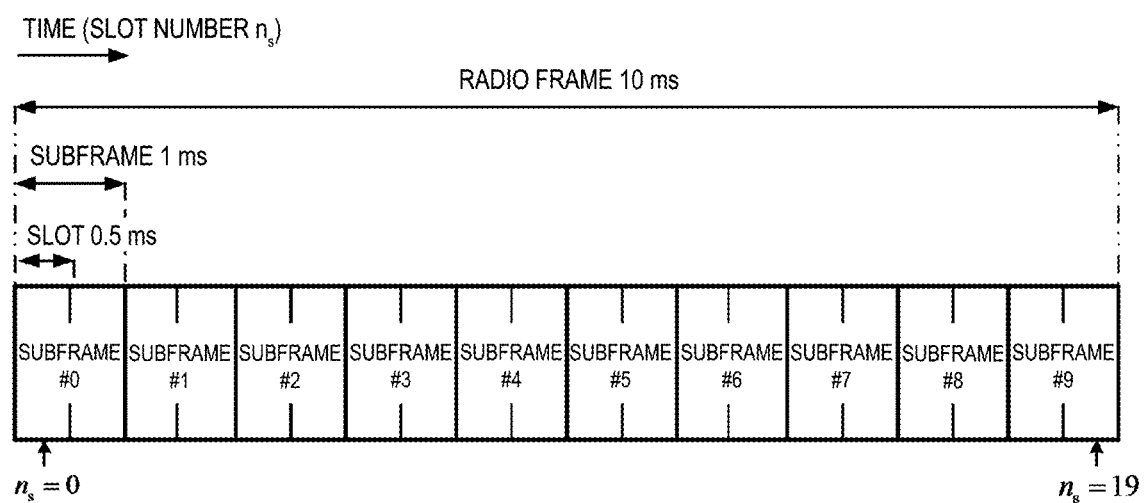
FIG. 2 is an example illustrating configurations of a radio frame, subframes, and slots according to one aspect of the present embodiment.

FIG. 2 is an example illustrating configurations of a radio frame, subframes, and slots according to one aspect of the present embodiment. In one example illustrated in FIG. 2, the length of the slot is 0.5 ms, the length of the subframe is 1 ms, and the length of the radio frame is 10 ms. The slot may be a unit for resource allocation in the time domain. For example, the slot may be a unit for mapping of one transport block. For example, the transport block may be mapped to one slot. Here, the transport block may be a unit of data to be transmitted in a prescribed interval (for example, Transmission Time Interval (TTI)) defined in a higher layer (for example, Mediam Access Control (MAC), Radio Resource Control (RRC)).

For example, the length of the slot may be given according to the number of OFDM symbols. For example, the number of OFDM symbols may be 7 or 14. The length of the slot may be given based on at least the length of the OFDM symbol. The length of the OFDM symbol may differ based on at least the second subcarrier spacing. The length of the OFDM symbol may be given based on at least the number of points of Fast Fourier Transform (FFT) used to generate the OFDM symbol. The length of the OFDM symbol may include a length of a Cyclic Prefix (CP) added to the OFDM symbol. Here, the OFDM symbol may be referred to as a symbol. In a case that a communication scheme other than OFDM is used in communications between the terminal apparatus 1 and the base station apparatus 3 (for example, in the use of SC-FDMA, DFT-s-OFDM, or the like), the generated SC-FDMA symbol and/or DFT-s-OFDM symbol is also referred to as an OFDM symbol. Here, for example, the length of the slot may be 0.25 ms, 0.5 ms, 1 ms, 2 ms, or 3 ms. Unless otherwise stated, OFDM includes SC-FDMA or DFT-s-OFDM.

The OFDM includes a multi-carrier communication scheme applying waveform shaping (Pulse Shape), PAPR reduction, out-of-band radiation reduction, or filtering, and/or phase processing (for example, phase rotation and the like). The multi-carrier communication scheme may be a communication scheme that generates/transmits a signal in which multiple subcarriers are multiplexed.

The length of the subframe may be 1 ms. The length of the subframe may be given based on the first subcarrier spacing. For example, in a case that the first subcarrier spacing is 15 kHz, the length of the subframe may be 1 ms. The subframe may include one or more slots.

The radio frame may be given according to the number of subframes. The number of subframes for the radio frame may be, for example, 10. The radio frame may be given according to the number of slots.

Figure 3:
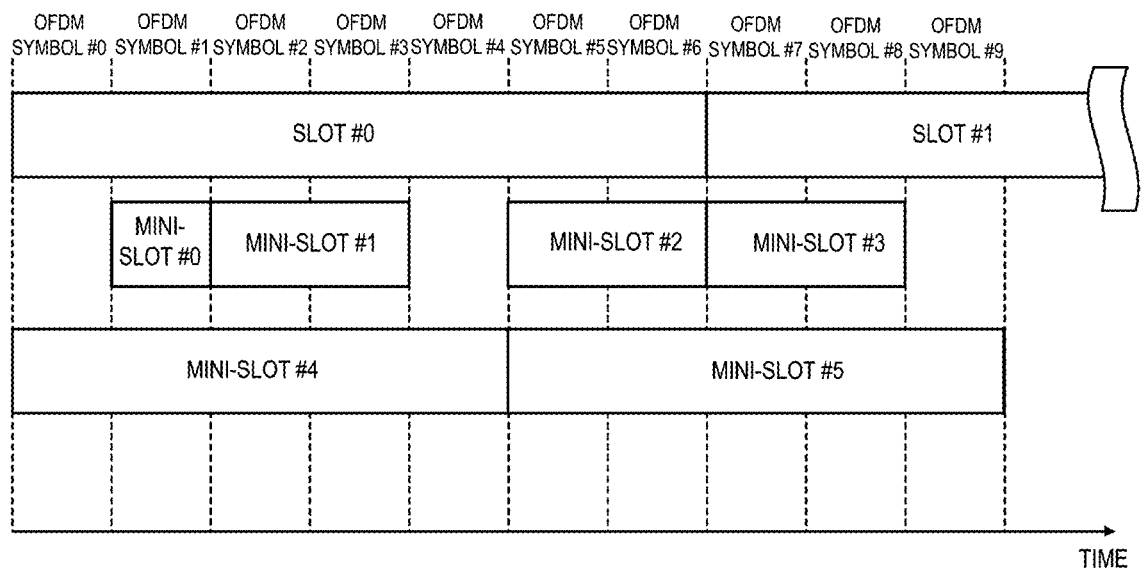
FIG. 3 is a diagram illustrating an example of configurations of slots and mini-slots according to one aspect of the present embodiment.

FIG. 3 is a diagram illustrating an example of configurations of slots and mini-slots according to one aspect of the present embodiment. In FIG. 3, the number of OFDM symbols constituting the slot is 7. The mini-slot may include one or more OFDM symbols which is less than the number of multiple OFDM symbols constituting a slot. The length of the mini-slot may be shorter than that of the slot. FIG. 3 illustrates the mini-slot #0 to the mini-slot #5 as examples of configurations of mini-slots. The mini-slot may include a single OFDM symbol, as indicated by the mini-slot #0. The mini-slot may include two OFDM symbols as indicated by the mini-slots #1 to #3. A gap (time interval) may be inserted between two mini-slots, as indicated by the mini-slot #1 and the mini-slot #2. The mini-slot may be configured so as to cross the boundary between the slot #0 and the slot #1, as indicated by the mini-slot #5. In other words, the mini-slot may be configured so as to cross the boundary between the slots. Here, the mini-slot is also referred to as a sub-slot. The mini-slot is also referred to as short Transmission Time Interval (short TTI (sTTI)). In the following, the slot may be replaced by the mini-slot. The mini-slot may include the same number of OFDM symbols as that of the slot. The mini-slot may include OFDM symbols, the number of which is greater than the number of multiple OFDM symbols constituting a slot. The length of the time domain of the mini-slot may be shorter than the length of the slot. The length of the time domain of the mini-slot may be shorter than the length of the subframe.

Physical channels and physical signals according to various aspects of the present embodiment will be described.

In FIG. 1, the following uplink physical channels are at least used for uplink radio communication from the terminal apparatus 1 to the base station apparatus 3. The uplink physical channels are used by a physical layer for transmission and/or reception of information output from a higher layer.

Physical Uplink Control Channel (PUCCH)
Physical Uplink Shared Channel (PUSCH)
Physical Random Access Channel (PRACH)

The PUCCH is used to transmit and/or receive Uplink Control Information (UCI). The uplink control information includes Channel State Information (CSI) of downlink channel, a Scheduling Request (SR) used to request a PUSCH (Uplink-Shared Channel (UL-SCH)) resource for initial transmission, and a Hybrid Automatic Repeat request ACKnowledgement (HARQ-ACK) for downlink data (Transport block (TB), Medium Access Control Protocol Data Unit (MAC PDU), Downlink-Shared Channel (DL-SCH), and Physical Downlink Shared Channel (PDSCH)). The HARQ-ACK indicates an acknowledgement (ACK) or a negative-acknowledgement (NACK). The HARQ-ACK is also referred to as HARQ feedback, HARQ information, HARQ control information, and ACK/NACK.

The Channel State Information (CSI) includes at least a Channel Quality Indicator (CQI) and a Rank Indicator (RI). The channel quality indicator may include a Precoder Matrix Indicator (PMI). The CQI is an indicator associated with channel quality (propagation strength), and the PMI is an indicator for indicating a precoder. The RI is an indicator for indicating a transmission rank (or the number of transmission layers).

The PUSCH is used to transmit and/or receive uplink data (TB, MAC PDU, UL-SCH, PUSCH). The PUSCH may be used to transmit and/or receive HARQ-ACK and/or channel state information together with the uplink data. The PUSCH may be used to transmit and/or receive only the channel state information or to transmit and/or receive only the HARQ-ACK and the channel state information. The PUSCH is used to transmit and/or receive a random access message 3.

The PRACH is used to transmit and/or receive a random access preamble (random access message 1). The PRACH is used for indicating initial connection establishment procedure, handover procedure, connection re-establishment procedure, synchronization (timing adjustment) for uplink data transmission, and a request for a PUSCH (UL-SCH) resource. The random access preamble may be used to notify the base station apparatus 3 of an index (random access preamble index) given by the higher layer of the terminal apparatus 1.

The random access preamble may be provided by cyclic-shifting of a Zadoff-Chu sequence corresponding to a physical root sequence index u. The Zadoff-Chu sequence may be generated based on the physical root sequence index u. In a single cell, multiple random access preambles may be defined. The random access preamble may be identified based on at least the index of the random access preamble. Different random access preambles corresponding to different indices of random access preambles may correspond to different combinations of the physical root sequence index u and the cyclic shift. The physical root sequence index u and the cyclic shift may be provided based on at least information included in the system information. The physical root sequence index u may be an index for identifying a sequence included in the random access preamble. The random access preamble may be identified based on at least the physical root sequence index u.

In FIG. 1, the following uplink physical signal is used for the uplink radio communication. The uplink physical signal need not be used for transmitting and/or receiving the information output from the higher layer, but is used by the physical layer.

Uplink Reference Signal (UL RS)

According to the present embodiment, at least the following two types of uplink reference signals may be used.

Demodulation Reference Signal (DMRS)

Sounding Reference Signal (SRS)

The DMRS is associated with transmission and/or reception of the PUSCH or the PUCCH. The DMRS is multiplexed with the PUSCH or the PUCCH. The base station apparatus 3 uses the DMRS in order to perform channel compensation of the PUSCH or the PUCCH. Transmission of both of the PUSCH and the DMRS is hereinafter referred to simply as transmission of the PUSCH. Transmission of both of the PUCCH and the DMRS is hereinafter referred to simply as transmission of the PUCCH. Reception of both of the PUSCH and the DMRS is hereinafter referred to simply as reception of the PUSCH. Reception of both of the PUCCH and the DMRS is hereinafter referred to simply as reception of the PUCCH.

The SRS need not be associated with transmission and/or reception of the PUSCH or the PUCCH. The base station apparatus 3 may use the SRS to measure the channel state. The SRS may be transmitted and/or received at the end of the subframe in an uplink slot or at an OFDM symbol of a prescribed number from the end.

In FIG. 1, the following downlink physical channels are used for downlink radio communication from the base station apparatus 3 to the terminal apparatus 1. The downlink physical channels are used by a physical layer for transmission and/or reception of information output from a higher layer.

Physical Broadcast Channel (PBCH)
Physical Downlink Control Channel (PDCCH)
Physical Downlink Shared Channel (PDSCH)

The PBCH is used for broadcasting a Master Information Block (MIB, a Broadcast Channel (BCH)) that is commonly used by the terminal apparatuses 1. The PBCH may be transmitted based on a prescribed transmission interval. For example, the PBCH may be transmitted at an interval of 80 ms. Contents of information included in the PBCH may be updated at every 80 ms. The PBCH may include 288 subcarriers. The PBCH may include 2, 3, or 4 OFDM symbols. The MIB may include information relating to an identifier (index) associated with a synchronization signal. The MIB may include information for indicating at least a part of: the number of the slot in which PBCH is transmitted, the number of the subframe in which PBCH is transmitted, and the number of the radio frame in which PBCH is transmitted.

The PDCCH (NR PDCCH) is used to transmit and/or receive Downlink Control Information (DCI). The downlink control information is also referred to as a DCI format. The downlink control information may include at least either a downlink grant or an uplink grant. The downlink grant is also referred to as a downlink assignment or a downlink allocation.

A single downlink grant is used for at least scheduling of a single PDSCH in a single serving cell. The downlink grant is used at least for the scheduling of the PDSCH within the same slot as the slot in which the downlink grant is transmitted. The downlink grant may be used for scheduling of the PDSCH within a slot different from the slot in which the downlink grant is transmitted.

A single uplink grant is used at least for scheduling of a single PUSCH in a single serving cell.

In the terminal apparatus 1, one or more control resource sets (CORESETs) are configured in order to search for the PDCCH. The terminal apparatus 1 attempts to receive the PDCCH in the configured control resource set. Details of the control resource set will be described later.

The PDSCH is used to transmit and/or receive downlink data (DL-SCH, PDSCH). The PDSCH is at least used to transmit and/or receive the random access message 2 (random access response). The PDSCH is at least used to transmit and/or receive the system information including parameters used for initial access.

In FIG. 1, the following downlink physical signals are used for the downlink radio communication. The downlink physical signal need not be used for transmitting and/or receiving the information output from the higher layer, but is used by the physical layer.

Synchronization signal (SS)

Downlink Reference Signal (DL RS)

The synchronization signal is used for the terminal apparatus 1 to establish synchronization in the frequency domain and the time domain in the downlink. The synchronization signal includes a Primary Synchronization Signal (PSS) and a Secondary Synchronization Signal (SSS).

The downlink reference signal is used for the terminal apparatus 1 to perform channel compensation on a downlink physical channel. The downlink reference signal is used for the terminal apparatus 1 to obtain the downlink channel state information.

According to the present embodiment, the following two types of downlink reference signals are used.

DeModulation Reference Signal (DMRS)

Shared Reference Signal (Shared RS)

The DMRS is associated with transmission and/or reception of the PDCCH and/or the PDSCH. The DMRS is multiplexed with the PDCCH or the PDSCH. In order to perform channel compensation of the PDCCH or the PDSCH, the terminal apparatus 1 may use the DMRS corresponding to the PDCCH or the PDSCH. Hereinafter, the transmission of the PDCCH and the DMRS corresponding to the PDCCH together is simply referred to as transmission of the PDCCH. Hereinafter, the reception of the PDCCH and the DMRS corresponding to the PDCCH together is simply referred to as reception of the PDCCH. Hereinafter, the transmission of the PDSCH and the DMRS corresponding to the PDSCH together is simply referred to as transmission of the PDSCH. Hereinafter, the reception of the PDSCH and the DMRS corresponding to the PDSCH together is simply referred to as reception of the PDSCH.

The Shared RS may be associated with transmission and/or reception of at least PDCCH. The Shared RS may be multiplexed with the PDCCH. The terminal apparatus 1 may use the Shared RS to perform channel compensation of the PDCCH. Hereinafter, the transmission of the PDCCH and the Shared RS together is also simply referred to as transmission of the PDCCH. Hereinafter, the reception of the PDCCH and the Shared RS together is also simply referred to as reception of the PDCCH.

The DMRS may be an RS which is individually configured for the terminal apparatus 1. The sequence of DMRS may be provided based on at least parameters individually configured for the terminal apparatus 1. The DMRS may be individually transmitted for the PDCCH and/or the PDSCH. On the other hand, the Shared RS may be an RS which is commonly configured for multiple terminal apparatuses 1. The sequence of Shared RS may be provided regardless of parameters individually configured for the terminal apparatus 1. For example, the Shared RS sequence may be given based on at least some of the slot number, the mini-slot number, or a cell ID (identity). The Shared RS may be RS transmitted regardless of whether the PDCCH and/or the PDSCH is transmitted.

The downlink physical channel and the downlink physical signal are also referred to as a downlink signal. The uplink physical channel and the uplink physical signal are also referred to as an uplink signal. The downlink physical channel and the uplink physical channel are collectively referred to as a physical channel. The downlink physical signal and the uplink physical signal are collectively referred to as a physical signal.

The BCH, the UL-SCH, and the DL-SCH are transport channels. The channel used in the Medium Access Control (MAC) layer is referred to as a transport channel. The unit of transport channels used in the MAC layer is also referred to as a transport block or a MAC PDU. A Hybrid Automatic Repeat reQuest (HARQ) is controlled for each transport block in the MAC layer. The transport block is a unit of data that the MAC layer delivers to the physical layer. In the physical layer, the transport block is mapped to a codeword, and modulation processing is performed for each codeword.

The base station apparatus 3 and the terminal apparatus 1 exchange (transmit and/or receive) a signal in the higher layer. For example, the base station apparatus 3 and the terminal apparatus 1 may transmit and/or receive Radio Resource Control (RRC) signaling (also referred to as a Radio Resource Control (RRC) message or Radio Resource Control (RRC) information) in a Radio Resource Control (RRC) layer. The base station apparatus 3 and the terminal apparatus 1 may transmit and/or receive a MAC Control Element (CE) in the MAC layer. Here, the RRC signaling and/or the MAC CE is also referred to as higher layer signaling.

The PUSCH and the PDSCH are at least used to transmit and/or receive the RRC signaling and the MAC CE. Here, the RRC signaling transmitted from the base station apparatus 3 through the PDSCH may be signaling common to the multiple terminal apparatuses 1 in the cell. The signaling common to the multiple terminal apparatuses 1 in the cell is also referred to as common RRC signaling. The RRC signaling transmitted from the base station apparatus 3 through the PDSCH may be signaling dedicated to a certain terminal apparatus 1 (also referred to as dedicated signaling or UE specific signaling). The signaling dedicated to the terminal apparatus 1 is also referred to as dedicated RRC signaling. A cell-specific parameter may be transmitted by using the signaling common to the multiple terminal apparatuses 1 in the cell or the signaling dedicated to the certain terminal apparatus 1. A UE-specific parameter may be transmitted by using the signaling dedicated to the certain terminal apparatus 1. The PDSCH including dedicated RRC signaling may be scheduled via the PDCCH in the control resource set. The PDSCH including common RRC signaling may be scheduled via the PDCCH in the control resource set.

Broadcast Control CHannel (BCCH), Common Control CHannel (CCCH), and Dedicated Control CHannel (DCCH) are logical channels. For example, the BCCH is a higher layer channel used to transmit the MIB. The Common Control Channel (CCCH) is a higher layer channel used to transmit and/or receive information common to the multiple terminal apparatuses 1. Here, the CCCH is used for the terminal apparatus 1 which is not in an RRC connection state, for example. The Dedicated Control Channel (DCCH) is a higher layer channel used to transmit and/or receive individual control information (dedicated control information) to the terminal apparatus 1. Here, the DCCH is used for the terminal apparatus 1 which is in an RRC connection state, for example.

The BCCH in the logical channel may be mapped to the BCH, the DL-SCH, or the UL-SCH in the transport channel. The CCCH in the logical channel may be mapped to the DL-SCH or the UL-SCH in the transport channel. The DCCH in the logical channel may be mapped to the DL-SCH or the UL-SCH in the transport channel.

The UL-SCH in the transport channel is mapped to the PUSCH in the physical channel. The DL-SCH in the transport channel is mapped to the PDSCH in the physical channel. The BCH in the transport channel is mapped to the PBCH in the physical channel.

Hereinafter, the control resource set will be described.

Figure 4:
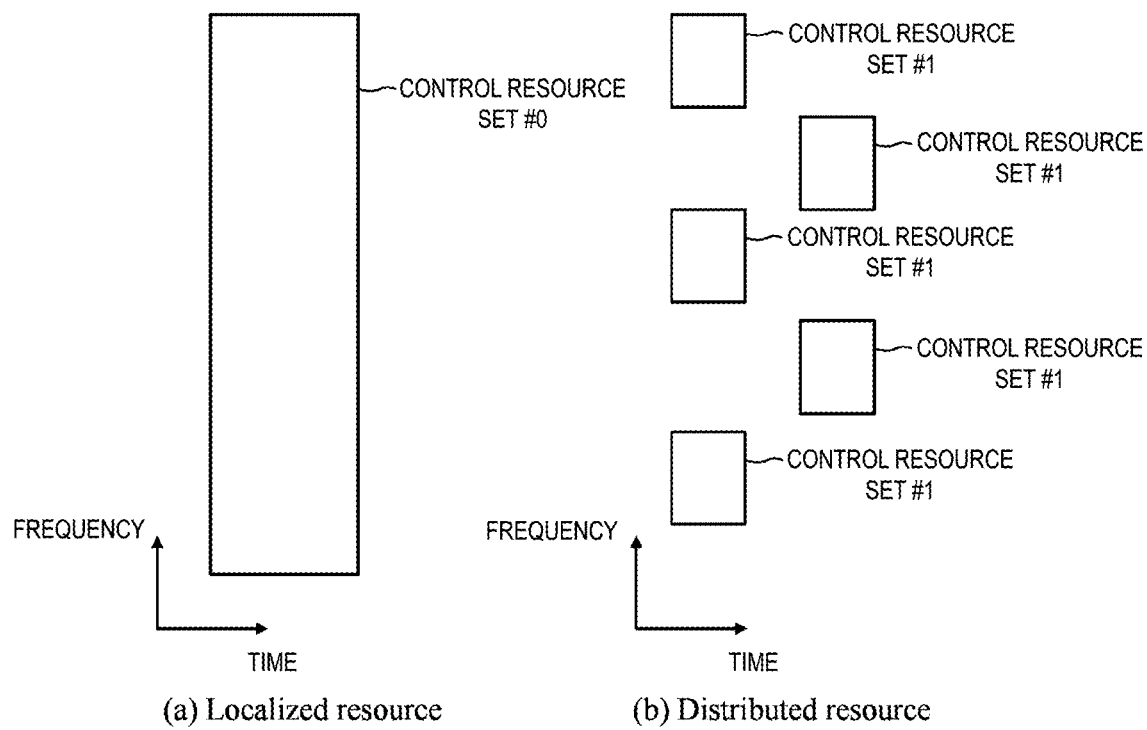
FIG. 4 is a diagram illustrating examples of mapping of control resource sets according to one aspect of the present embodiment.

FIG. 4 is a diagram illustrating examples of mapping of control resource sets according to one aspect of the present embodiment. The control resource set may indicate a time frequency domain in which one or more control channels can be mapped. The control resource set may be a region in which the terminal apparatus 1 attempts to receive and/or detect (blind detection (Blind Decoding (BD))) the PDCCH. As illustrated in FIG. 4(a), the control resource set may include continuous resources (Localized resources) in the frequency domain. As illustrated in FIG. 4(b), the control resource set may include non-continuous resources (distributed resources) in the frequency domain.

In the frequency domain, the unit of mapping the control resource sets may be a resource block. In the time domain, the unit of mapping the control resource sets may be the OFDM symbol.

The frequency domain of the control resource set may be identical to the system bandwidth of the serving cell. The frequency domain of the control resource set may be provided based on at least the system bandwidth of the serving cell. The frequency domain of the control resource set may be provided based on at least higher layer signaling and/or downlink control information. For example, the position of the resource blocks constituting the control resource set is notified from the base station apparatus 3 to the terminal apparatus 1 by using higher layer signaling. The position of the resource blocks constituting the control resource set for each control resource is notified from the base station apparatus 3 to the terminal apparatus 1 by using higher layer signaling.

The time domain of the control resource set may be provided based on at least higher layer signaling and/or downlink control information. For example, the starting position and the end position of the OFDM symbol constituting the control resource set are notified from the base station apparatus 3 to the terminal apparatus 1 by using higher layer signaling. For example, the number of OFDM symbols constituting the control resource set is notified from the base station apparatus 3 to the terminal apparatus 1 by using higher layer signaling. For example, the position of the subframe in which the control resource set is allocated is notified from the base station apparatus 3 to the terminal apparatus 1 by using higher layer signaling. For example, the position of the slot in which the control resource set is allocated is notified from the base station apparatus 3 to the terminal apparatus 1 by using higher layer signaling.

The control resource set may include at least one or both of a Common control resource set (Common CORESET) and a Dedicated control resource set (UE specific CORESET). The common control resource set may be a control resource set configured commonly to the multiple terminal apparatuses 1. The common control resource set may be given based on at least the synchronization signal, MIB, first system information, second system information, common RRC signaling, the cell ID, and the like. For example, the position of the subframe in which the common control resource set is allocated may be given based on at least the synchronization signal, MIB, common RRC signaling, and the like. The dedicated control resource set may be a control resource set configured to be dedicatedly used for individual terminal apparatuses 1. The dedicated control resource set may be provided based on at least dedicated RRC signaling and/or a value of C-RNTI.

The control resource set may be a set of control channels (or control channel candidates) to be monitored by the terminal apparatus 1. The control resource set may include a set of control channels (or control channel candidates) to be monitored by the terminal apparatus 1. The control resource set may include one or more Search Spaces (SS). The control resource set may be synonymous with the search space.

The search space includes one or more PDCCH candidates. The terminal apparatus 1 receives a PDCCH candidate included in the search space and attempts to receive the PDCCH. Here, the PDCCH candidate is also referred to as a blind detection candidate.

The search space may include at least one or both of Common Search Space (CSS) and UE-specific Search Space (USS). The CSS may be a search space configured commonly to multiple terminal apparatuses 1. The USS may be a search space including a configuration to be dedicatedly used for individual terminal apparatuses 1. The CSS may be given based on at least the synchronization signal, MIB, the first system information, the second system information, the common RRC signaling, the cell ID, or the like. The USS may be provided based on at least the dedicated RRC signaling and/or the value of C-RNTI.

For the CSS, the type 0 PDCCH CSS for the DCI format scrambled with the SI-RNTI used to transmit system information in the primary cell, and the type 1 PDCCH CSS for the DCI format scrambled with the INT-RNTI used for initial access may be used. The terminal apparatus 1 can monitor the PDCCH candidates in the search spaces. The DCI format scrambled with a prescribed RNTI may be a DCI format to which the Cyclic Redundancy Check (CRC) scrambled with the prescribed RNTI has been added.

Note that the PDCCH and/or DCI included in the CSS need not include a Carrier Indicator Field (CIF) indicating for which serving cell (or which component carrier) the PDCCH/DCI schedules the PDSCH or the PUSCH.

Note that in a case that a carrier aggregation is configured in which multiple serving cells and/or multiple component carriers are aggregated for the terminal apparatus 1 to perform communication (transmission and/or reception), the PDCCH and/or DCI included in the USS for the prescribed serving cell (prescribed component carrier) includes the CIF indicating for which serving cell and/or which component carrier the PDCCH/DCI schedules the PDSCH or PUSCH.

Note that in a case that communication is performed by using one serving cell and/or one component carrier for the terminal apparatus 1, the PDCCH and/or DCI included in the USS may not include the CIF indicating for which serving cell and/or which component carrier the PDCCH/DCI schedules the PDSCH or PUSCH.

The common control resource set may include the CSS. The common control resource set may include both of the CSS and the USS. The dedicated control resource set may include the USS. The dedicated control resource set need not include the CSS.

In the common control resource set, the PDCCH including PDSCH resource allocation information including Remaining Minimum System Information (RMSI) may be transmitted and/or received. In the common control resource set, the PDCCH including resource allocation information of PDSCH including Random Access Response (RAR) may be transmitted and/or received. In the common control resource set, the PDCCH including control information indicating Pre-emption resources may be transmitted and/or received. In the common control resource set, the PDCCH including control information indicating a slot format indicator may be transmitted and/or received. Note that multiple common control resource sets may be configured, and each common control resource set may be allocated in different subframes. Note that multiple common control resource sets may be configured, and each common control resource set may be allocated in the same subframe. Note that multiple common control resource sets may be configured, and different PDCCH and different control information may be mapped in each common control resource set.

Multiple dedicated control resource sets may be configured within a subframe. Multiple dedicated control resource sets may be configured, and each dedicated control resource set may be allocated in the same subframe. Multiple dedicated control resource sets may be configured, and each dedicated control resource set may be allocated in different subframes.

A physical resource of the search space includes a Control Channel Element (CCE) of the control channel. The CCE includes a prescribed number of Resource Element Groups (REGs). For example, the CCE may include six REGs. An REG may include a single OFDM symbol of a single Physical Resource Block (PRB). In other words, the REG may include 12 Resource Elements (REs). The PRB is also simply referred to as a Resource Block (RB).

In other words, the terminal apparatus 1 can detect the PDCCH and/or DCI for the terminal apparatus 1 by blind detecting the PDCCH candidates included in the search space in the control resource set.

The number of times of blind detection for one control resource set in one serving cell and/or one component carrier may be determined based on the type of search space for the PDCCH included in the control resource set, the type of aggregation level, and the number of PDCCH candidates. Here, the type of the terminal space may include at least one of the CSS and/or the USS and/or the UE Group SS (UGSS) and/or the Group CSS (GCSS). The type of aggregation level may indicate the maximum aggregation level supported for the CCE constituting the search space, and may be defined/configured from at least one of $\{1, 2, 4, 8, \ldots, X\}$ (where X is a prescribed value). The number of PDCCH candidates may indicate the number of PDCCH candidates for a certain aggregation level. In other words, the number of PDCCH candidates may be defined/configured for each of the multiple aggregation levels. Note that the UGSS may be a search space that is commonly allocated to one or more terminal apparatuses 1. The GCSS may be a search space in which the DCI including parameters associated with the CSS is mapped for one or more terminal apparatuses 1. Note that the aggregation level indicates an aggregation level of a prescribed number of CCEs, and is associated with the total number of CCEs constituting one PDCCH and/or search space. Details of the configuration of the number of PDCCH candidates in the control resource set according to the embodiments of the present invention will be described later.

Note that the size of the aggregation level may be associated with the coverage corresponding to the PDCCH and/or the search space or the size of DCI (DCI format size, payload size) included in the PDCCH and/or the search space.

Note that in a case that the starting position (starting symbol) of the PDCCH symbol is configured for one control resource set, and the more than one PDCCH in control resource set can be detected in a prescribed period of time, for the time domain corresponding to each starting symbol, the type of search space for the PDCCH included in the control resource set, the type of aggregation level, and the number of PDCCH candidates may be configured. Each of the type of search space, the type of aggregation level, and the number of PDCCH candidates for the PDCCH included in the control resource set may be configured for each control resource set, may be provided/configured via DCI and/or higher layer signaling, or may be defined/configured in advance by specifications. Note that the number of PDCCH candidates may be the number of PDCCH candidates for a prescribed period of time. Note that the prescribed period of time may be 1 millisecond. The prescribed period of time may be 1 microsecond. The prescribed period of time may be one slot period. The prescribed period of time may be one OFDM symbol period.

Note that in a case that there are more than one PDCCH symbol starting positions (starting symbols) for one control resource set, in other words, in a case that there are multiple timings for blind detection (monitoring) of the PDCCH in a prescribed period of time, for the time domain corresponding to each starting symbol, the type of search space for the PDCCH included in the control resource set, the type of aggregation level, and the number of PDCCH candidates may be configured. Each of the type of search space, the type of aggregation level, and the number of PDCCH candidates for the PDCCH included in the control resource set may be configured for each control resource set, may be provided/configured via DCI and/or higher layer signaling, or may be defined/configured in advance by specifications.

Note that a way of the indication of the number of PDCCH candidates may be configured such that a number to reduce from a prescribed number of PDCCH candidates is defined/configured for each aggregation level.

The terminal apparatus 1 transmits/reports capability information associated with blind detection to the base station apparatus 3. The terminal apparatus 1 may transmit/report the number of PDCCH candidates that can be processed in one subframe as capability information related to PDCCH to the base station apparatus 3. In a case that more than a prescribed number of control resource sets can be configured for one or more serving cells/component carriers, the terminal apparatus 1 may transmit/report the capability information associated with the blind detection to the base station apparatus 3.

In a case that the terminal apparatus 1 supports the first slot format and the second slot format, the terminal apparatus 1 may transmit/report capability information associated with the slot format to the base station apparatus 3.

In a case that more than a prescribed number of control resource sets can be configured for a prescribed period of one or more serving cells/component carriers, the terminal apparatus 1 may transmit/report the capability information associated with the blind detection to the base station apparatus 3.

Note that the capability information associated with the blind detection may include information indicating the maximum number of times of blind detection in a prescribed period. The capability information associated with the blind detection may include information indicating that the PDCCH candidates can be reduced. The capability information associated with the blind detection may include information indicating the maximum number of control resource sets that can be blind-detected in a prescribed period. Each of the maximum number of control resource sets and the maximum number of serving cells and/or component carriers capable of monitoring the PDCCH may be configured as individual parameters, or may be configured as common parameters. The capability information associated with the blind detection may include information indicating a maximum number of control resource sets that can simultaneously perform blind detection in a prescribed period of time.

In a case that the terminal apparatus 1 does not support the capability of detecting (blind detection of) more than a prescribed number of control resource sets in a prescribed period of time, the terminal apparatus 1 may not transmit/notify the capability information associated with the blind detection. In a case that the capability information associated with the blind detection is not received, the base station apparatus 3 may perform configuration related to the control resource sets so as not to exceed the prescribed number of times of blind detection to transmit the PDCCH.

The configuration related to the control resource set may include a parameter indicating a starting position (starting symbol) of the PDCCH. The configuration related to the control resource set may include a parameter indicating a time resource region of the control resource set (the number of OFDM symbols constituting the control resource set, the position of the subframe in which the control resource set is allocated). The configuration related to the control resource set may include a parameter indicating a frequency resource region of the control resource set (the number of resource blocks constituting the control resource set). The configuration related to the control resource set may include a parameter indicating the type of mapping from the CCE to the REG. The configuration related to the control resource set may include an REG bundle size. The configuration related to the control resource set may include a parameter indicating a quasi-allocation of the PDCCH antenna ports in the control resource set (whether the PDCCH uses the same resource as a prescribed antenna port). The configuration related to the control resource set may include a parameter indicating the CCE aggregation level of the USS. The configuration related to the control resource set may include a parameter indicating a period (a period of the subframe and a starting position of the subframe) for monitoring the PDCCH and/or the control resource set. Depending on the PDCCH starting position, the maximum number of times of blind detection of PDCCH may be configured individually.

The unit of the physical resource according to the present embodiment will be described below.

Figure 5:
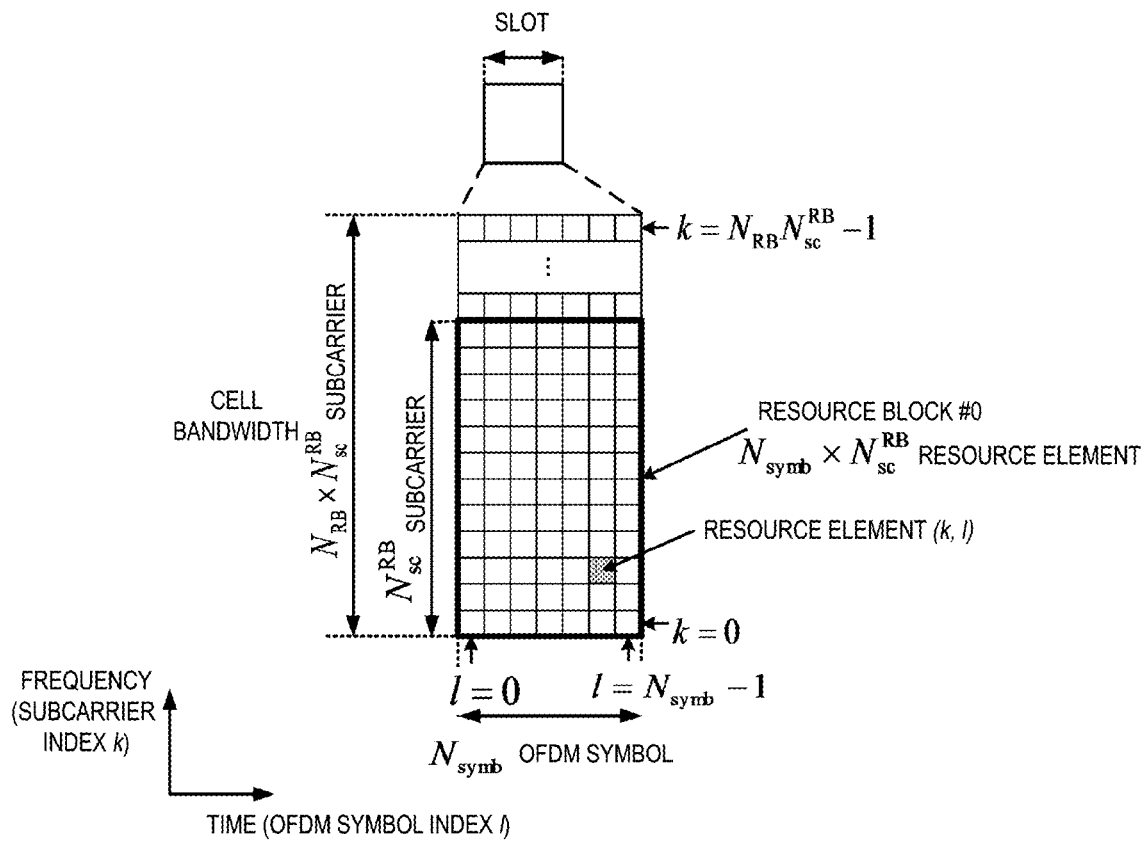
FIG. 5 is a diagram illustrating an example of resource elements included in a slot according to one aspect of the present embodiment.

FIG. 5 is a diagram illustrating an example of resource elements included in a slot according to one aspect of the present embodiment. Here, the resource element is a resource defined by one OFDM symbol and one subcarrier. As illustrated in FIG. 5, the slot includes $N_{symb}$ pieces of OFDM symbols. The number of subcarriers included in the slot may be given by a product of the number of resource blocks $N_{RB}$ included in the slot and the number of subcarriers per resource block $N^{RB}_{SC}$. Here, the resource block is a group of the resource elements in the time domain and the frequency domain. The resource block may be used as a unit of resource allocation in the time domain and/or the frequency domain. For example, the $N^{RB}_{SC}$ may be 12. The $N_{symb}$ may be the same as the number of OFDM symbols included in the subframe. The $N_{symb}$ may be the same as the number of OFDM symbols included in the slot. $N_{RB}$ may be given based on the bandwidth of the cell and the first subcarrier spacing. The $N_{RB}$ may also be given based on the bandwidth of the cell and the second subcarrier spacing. The $N_{RB}$ may be given based on higher layer signaling (for example, RRC signaling) transmitted from the base station apparatus 3, and the like. Additionally, the $N_{RB}$ may be given based on the description in the specifications, and the like. The resource element is identified by an index k for the subcarrier and an index l for the OFDM symbol.

Figure 6:
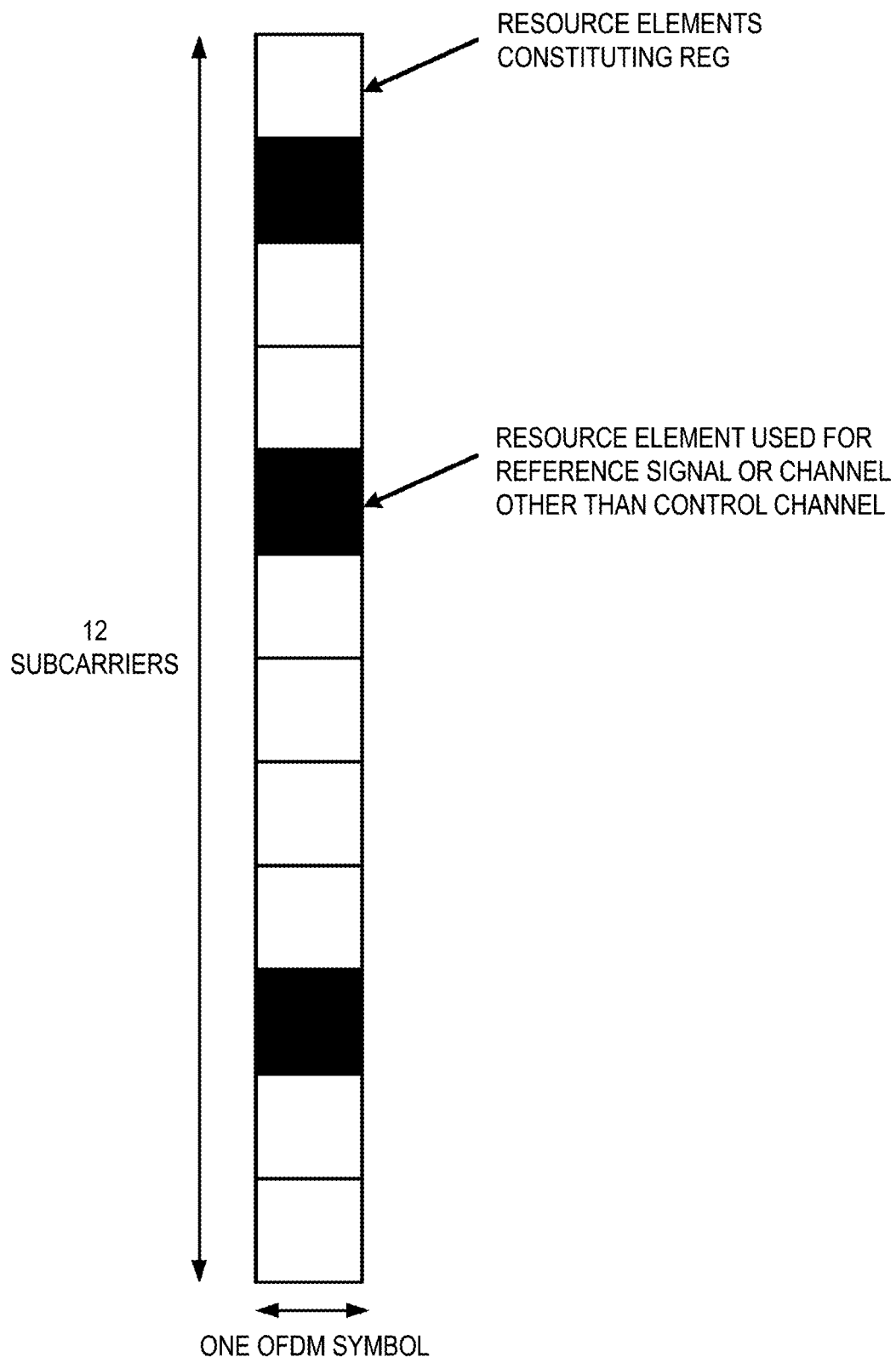
FIG. 6 is a diagram illustrating an example of a configuration of one REG according to one aspect of the present embodiment.

FIG. 6 is a diagram illustrating an example of a configuration of one REG according to one aspect of the present embodiment. The REG may include one OFDM symbol in one PRB. That is, the REG may include 12 pieces of continuous REs in the frequency domain. Some of the REs constituting the REG may be a RE to which the downlink control information is not mapped. The REG may include the RE to which the downlink control information is not mapped or may not include the RE to which the downlink control information is not mapped. The RE to which the downlink control information is not mapped may be a RE to which the reference signal is mapped, may be a RE to which a channel other than the control channel is mapped, or may be a RE which the terminal apparatus 1 assumes to have no control channel mapped.

Figure 7:
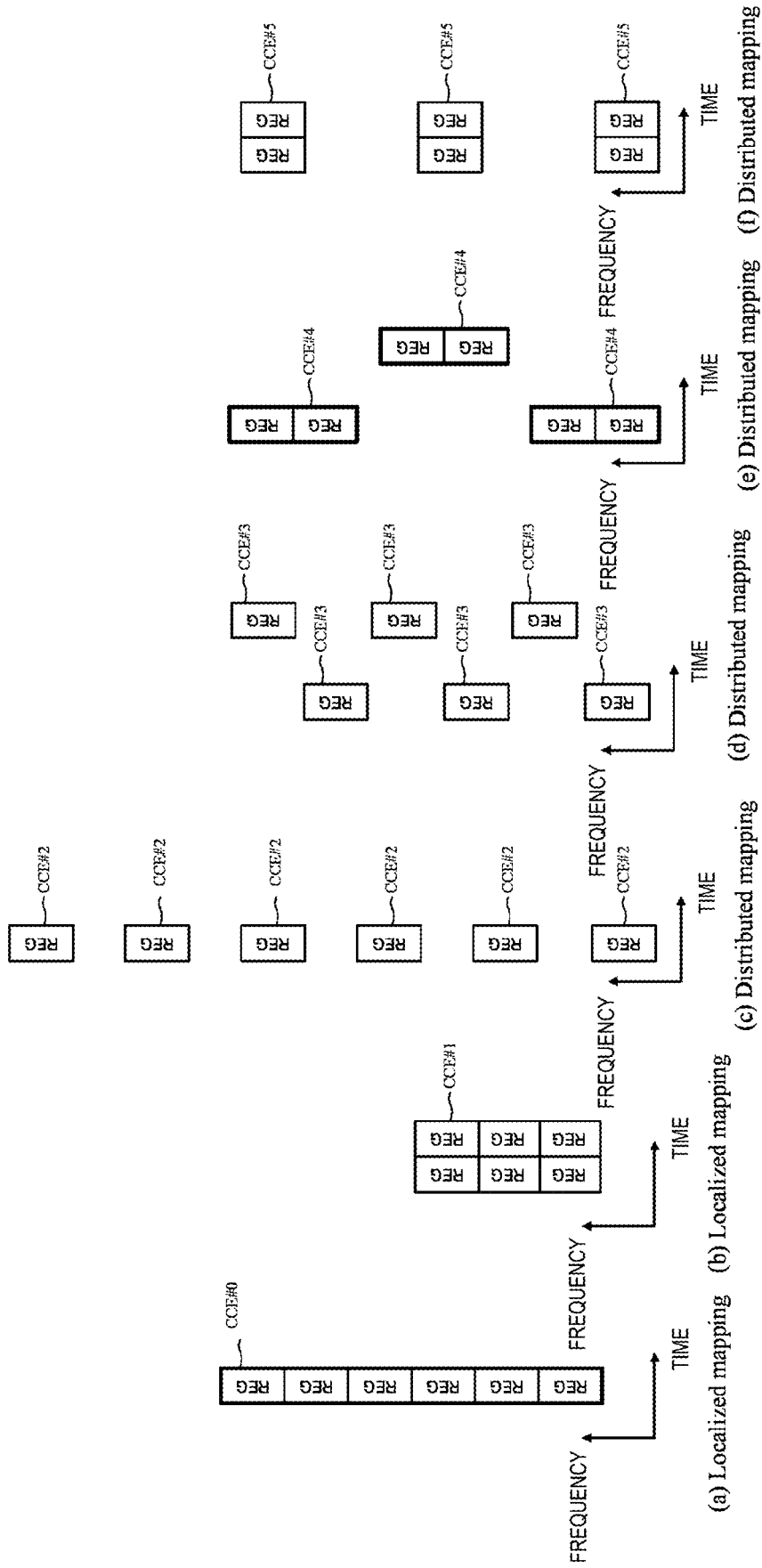
FIG. 7 is a diagram illustrating examples of configurations of CCEs according to one aspect of the present embodiment.

FIG. 7 is a diagram illustrating examples of configurations of CCEs according to one aspect of the present embodiment. The CCE may include six REGs. As illustrated in FIG. 7(a), the CCE may include continuously mapped REGs (such mapping may be referred to as Localized mapping). Note that not all REGs constituting the CCE need to be continuous in the frequency domain. For example, in a case that not all of the multiple resource blocks constituting the control resource set are contiguous in the frequency domain, each resource block constituting each REG with contiguous numbers is not contiguous in the frequency domain, even though the numbers assigned to the REGs are continuous. In a case that the control resource set includes multiple OFDM symbols and multiple REGs constituting one CCE is allocated over multiple time periods (OFDM symbols), as shown in FIG. 7(b), the CCE may be configured by a group of REGs that are mapped continuously. As illustrated in FIG. 7(c), the CCE may include non-continuously mapped REGs (such mapping may be referred to as Distributed mapping). In a case that the control resource set includes multiple OFDM symbols and multiple REGs constituting one CCE is allocated over multiple time periods (OFDM symbols), as shown in FIG. 7(d), the CCE may be configured by REGs in which REGs with different time periods (OFDM symbols) are mixed and non-continuously mapped. As shown in FIG. 7(e), the CCE may include REGs mapped in a distributed manner in a unit of group of multiple REGs. As shown in FIG. 7(f), the CCE may include REGs mapped in a distributed manner in the unit of group of multiple REGs.

The CCE may include one or more REG groups. The REG group is also referred to as an REG bundle. The number of REGs constituting one REG group is referred to as a Bundle size. The terminal apparatus 1 may assume that precoders applied to the REs in the REG group are the same. The terminal apparatus 1 can perform channel estimation assuming that the precoder applied to the REs in the REG group is the same. Meanwhile, the terminal apparatus 1 may assume that the precoders applied to the REs are not the same between the REG groups. In other words, the terminal apparatus 1 need not assume that the precoders applied to the REs are the same between the REG groups. The phrase "between the REG groups" may also be interpreted as "between the two different REG groups". The terminal apparatus 1 can perform the channel estimation assuming that the precoders applied to the REs are not the same between the REG groups. The details of the REG group are described later.

The number of CCEs constituting the PDCCH candidate is also referred to as an Aggregation Level (AL). In a case that one PDCCH candidate includes multiple CCEs aggregated, one PDCCH candidate includes multiple CCEs having continuous numbers of CCEs. A collection of the PDCCH candidates with the aggregation level of $AL_X$ is also referred to as a search space with the aggregation level $AL_X$. In other words, the search space with the aggregation level $AL_X$ may include one or more PDCCH candidates with the aggregation level of $AL_X$. The search space may also include the PDCCH candidates with the multiple aggregation levels. For example, the CSS may include the PDCCH candidates with the multiple aggregation levels. The USS may include the PDCCH candidates with the multiple aggregation levels. A set of the aggregation levels of the PDCCH candidates included in the CSS may be defined/configured from a set of the aggregation levels of the PDCCH candidates included in the USS.

Hereinafter, the REG group will be described.

The REG group may be used for channel estimation in the terminal apparatus 1. For example, the terminal apparatus 1 performs the channel estimation for each REG group. This is based on a difficulty in performing the channel estimation (for example, MMSE channel estimation and the like) in the REs for the reference signals to which different precoders are applied. Here, the MMSE is an abbreviation for Minimum Mean Square Error.

The accuracy of channel estimation varies depending on at least a power allocated to the reference signal, a density of an RE in the time frequency domain, the RE being used for the reference signal, an environment of a radio channel, and the like. The accuracy of channel estimation varies depending on at least the time frequency domain used for the channel estimation. In various aspects of the present embodiment, the REG group may be used as a parameter to configure the time frequency domain used for the channel estimation.

That is, a larger REG group means that a higher gain of the channel estimation accuracy can be obtained. Meanwhile, a smaller REG group means that a larger number of REG groups are included in one PDCCH candidate. The larger number of REG groups in one PDCCH candidate is preferable for a transmission method (referred to as precoder rotation, precoder cycling, and the like) that obtains spatial diversity by applying individual precoders to the respective REG groups.

One REG group may include the REGs which are continuous or close in the time domain and/or the frequency domain.

The REG group in the time domain is preferable for improving the channel estimation accuracy and/or reduction in the reference signals. For example, the number of REGs constituting the REG group in the time domain may be 1, 2, 3, or another value. The number of REGs constituting the REG group in the time domain may be given based on at least the number of OFDM symbols included in the control resource set.

Additionally, the number of REGs constituting the REG group in the time domain may be the same as the number of OFDM symbols included in the control resource set.

The REG group in the frequency domain contributes to the improvement of the channel estimation accuracy. For example, the number of REGs constituting the REG group in the frequency domain may be 2, may be 3, may be at least a multiple of 2, or may be at least a multiple of 3. Additionally, the number of REGs constituting the REG group in the frequency domain may be given based on at least the number of PRBs in the control resource set. Additionally, the number of REGs constituting the REG group in the frequency domain may be the same as the number of PRBs included in the control resource set.

Figure 8:
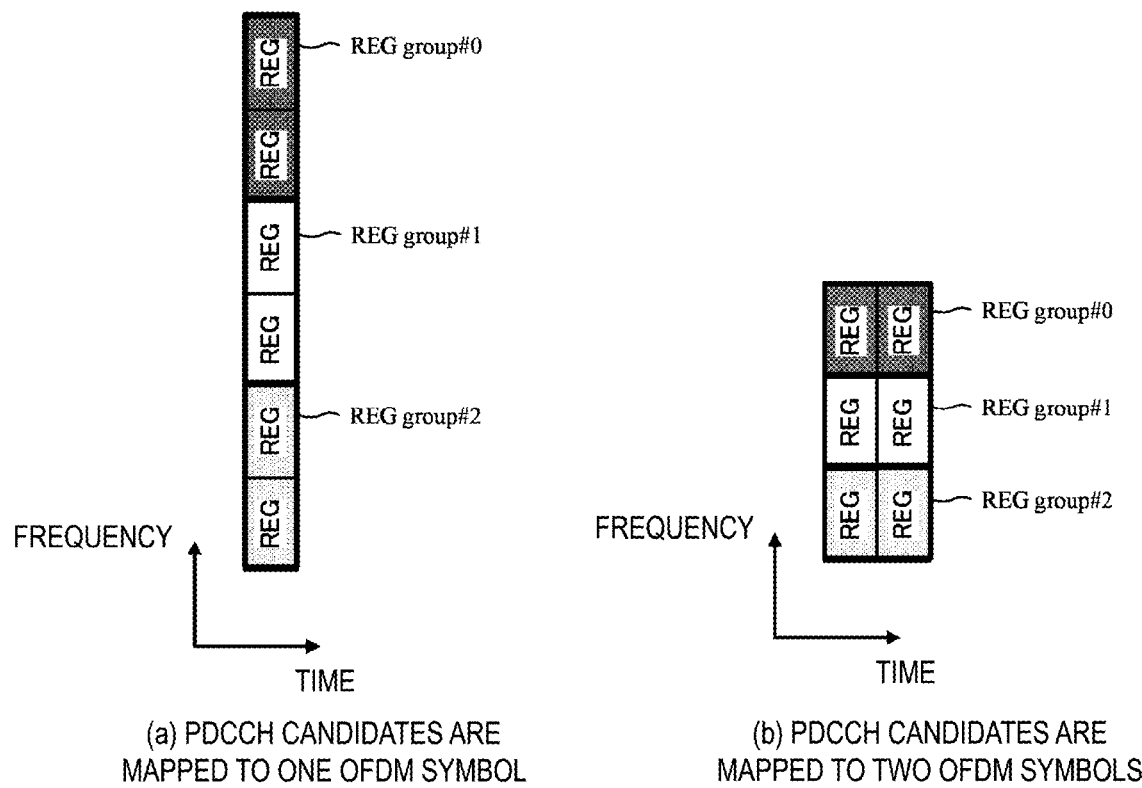
FIG. 8 is a diagram illustrating examples of a relationship between the number of REGs constituting an REG group and a mapping method of PDCCH candidates according to one aspect of the present embodiment.

FIG. 8 is a diagram illustrating examples of REGs constituting a PDCCH candidate and the number of REGs constituting a group of REGs according to one aspect of the present embodiment. In one example illustrated in FIG. 8(a), the PDCCH candidates are mapped to one OFDM symbol, and three REG groups including two REGs are configured. In other words, in one example illustrated in FIG. 8(a), one REG group includes two REGs. The number of REGs constituting the REG group in the frequency domain may include a divisor of the number of PRBs mapped in the frequency direction. In the example illustrated in FIG. 8(a), the number of REGs constituting the REG group in the frequency domain may be 1, 2, 3, or 6.

In one example illustrated in FIG. 8(b), the PDCCH candidates are mapped to two OFDM symbols, and three REG groups including two REGs are configured. In one example illustrated in FIG. 8(b), the number of REGs constituting the REG group in the frequency domain may be either 1 or 3.

The number of REGs constituting the REG group in the frequency domain may be given based on at least the number of OFDM symbols to which the PDCCH candidates are mapped. The number of REGs constituting the REG group in the frequency domain may be configured individually for the number of OFDM symbols to which the PDCCH candidate is mapped. The number of OFDM symbols to which the PDCCH candidates are mapped may differ based on whether the mapping of REGs constituting the CCE is Time first mapping or Frequency first mapping. That is, the number of REGs constituting the REG group in the frequency domain may be given based on at least the mapping of the REGs constituting the CCE. The number of REGs constituting the REG group in the frequency domain may be configured individually for the mapping of the REGs constituting the CCE. The mapping of the REGs constituting the CCE may be either Time first mapping or Frequency first mapping. The mapping of the REGs constituting the CCE may be either continuous mapping or non-continuous mapping. The number of REGs constituting the REG group in the frequency domain may be given based on at least the number of OFDM symbols to which one CCE is mapped. The number of REGs constituting the REG group in the frequency domain may be configured individually for the number of OFDM symbols to which one CCE is mapped.

Figure 9:
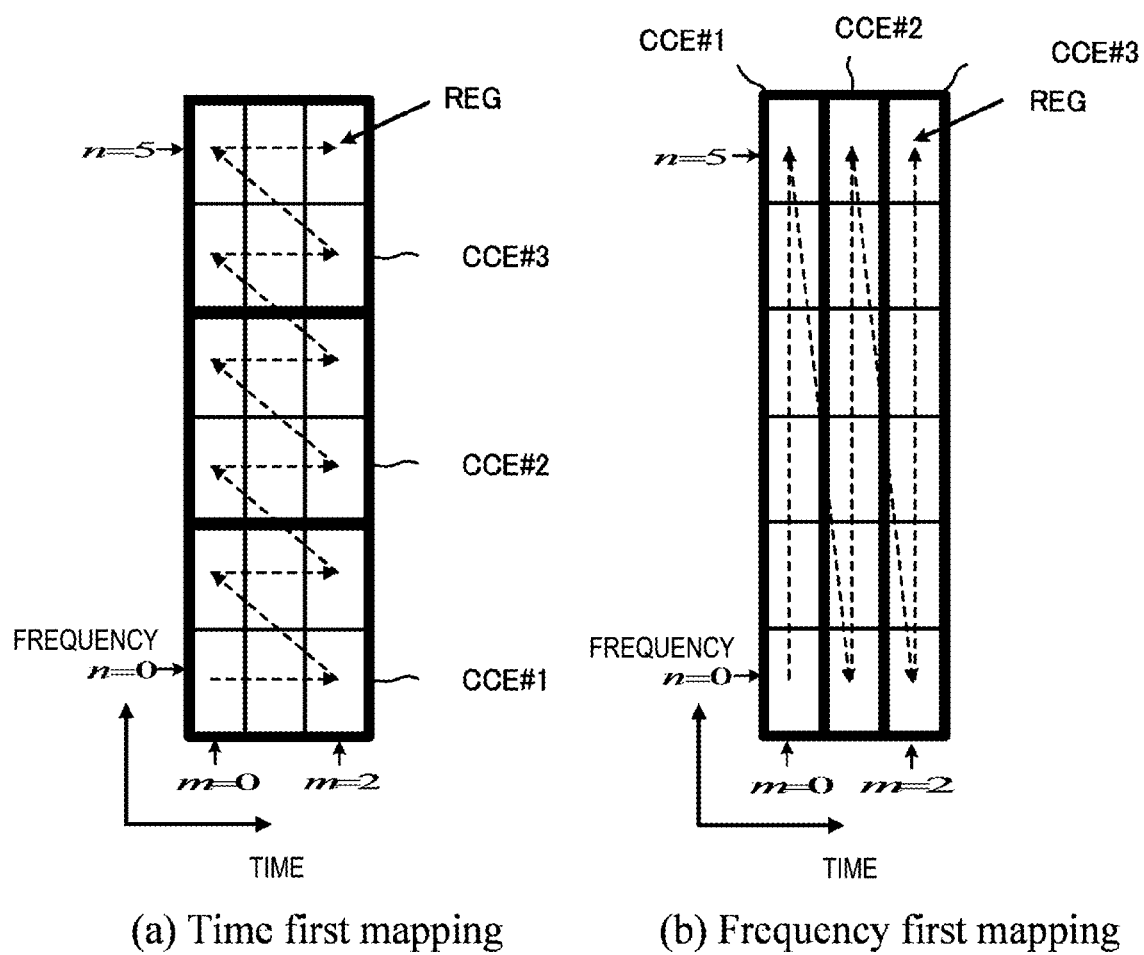
FIG. 9 is a diagram illustrating an example of mapping of REGs constituting CCEs according to one aspect of the present embodiment.

FIG. 9 is a diagram illustrating an example of mapping of REGs constituting CCEs according to one aspect of the present embodiment. Here, a case in which the number of OFDM symbols constituting the control resource set is three is shown. In FIG. 9, the CCE includes six REGs. In FIG. 9, values of m=0 to 2 (0, 1, 2) are assigned to indices m of the REGs in the time domain from the left. In FIG. 9, values of n=0 to 5 (0, 1, 2, 3, 4, 5) are assigned to indices n of the REGs in the frequency domain from below. FIG. 9(a) illustrates an example in which the REGs constituting the CCE are mapped in a Time first manner. The Time first mapping is a mapping method that maps the REGs from a lower (smaller) index to a higher (larger) index of the REGs in the time domain and increment the index of the REG in the frequency domain by one at a point of time when the index of the REG in the time domain reaches the maximum. FIG. 9(b) illustrates an example in which the REGs constituting the CCE are mapped in a Frequency first manner. The Frequency first mapping is a mapping method that maps the REGs from a lower (smaller) index to a higher (larger) index of the REGs in the frequency domain and increment the index of the REG in the time domain by one at a point of time when the index of the REG in the frequency domain reaches the maximum.

The number of REGs constituting the REG group in the time domain may be given based on at least the number of OFDM symbols to which the PDCCH candidates are mapped. The number of REGs constituting the REG group in the time domain may be configured individually for the number of OFDM symbols to which the PDCCH candidates are mapped. The number of REGs constituting the REG group in the time domain may be given based on at least the number of OFDM symbols to which one CCE is mapped. The number of REGs constituting the REG group in the time domain may be configured individually for the number of OFDM symbols to which one CCE is mapped.

The REG group in the time domain is also preferable for reduction in the reference signals. In a case that the REG group is configured as illustrated in FIG. 8(b), the reference signal may be included in an anterior OFDM symbol and/or a posterior OFDM symbol. For example, in the time domain, the first REG (head REG) in the REG group may include a RE to which the downlink control information is not mapped, and REGs other than the first REG in the REG group need not include REs to which the downlink control information is not mapped.

An example of a configuration of the terminal apparatus 1 according to one aspect of the present embodiment will be described below.

Figure 10:
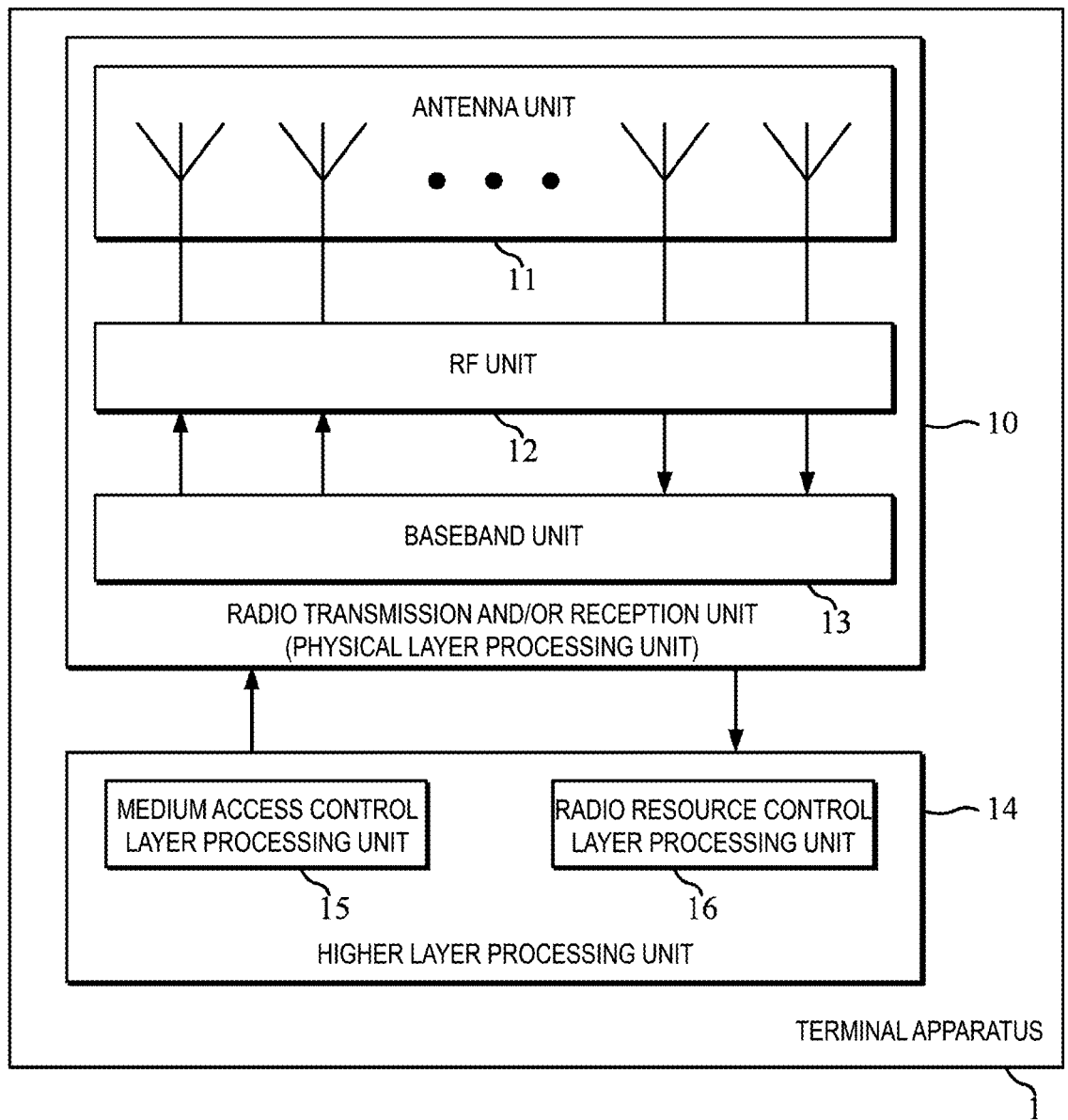
FIG. 10 is a schematic block diagram illustrating a configuration of a terminal apparatus 1 according to the present embodiment.

FIG. 10 is a schematic block diagram illustrating a configuration of a terminal apparatus 1 according to the present embodiment. As illustrated, the terminal apparatus 1 includes a radio transmission and/or reception unit 10 and a higher layer processing unit 14. The radio transmission and/or reception unit 10 includes an antenna unit 11, a Radio Frequency (RF) unit 12, and a baseband unit 13. The higher layer processing unit 14 includes a medium access control layer processing unit 15 and a radio resource control layer processing unit 16. The radio transmission and/or reception unit 10 is also referred to as a transmitter, a receiver or a physical layer processing unit. The physical layer processing unit includes a decoding unit. The receiver of the terminal apparatus 1 receives the PDCCH. The decoding unit of the terminal apparatus 1 decodes the received PDCCH. More specifically, the decoding unit of the terminal apparatus 1 performs blind decoding processing on the received signal of the resource corresponding to the PDCCH candidate of the USS.

The higher layer processing unit 14 outputs uplink data (transport block) generated by a user operation or the like, to the radio transmission and/or reception unit 10. The higher layer processing unit 14 performs processing of a MAC layer, a Packet Data Convergence Protocol (PDCP) layer, a Radio Link Control (RLC) layer, and an RRC layer.

The medium access control layer processing unit 15 included in the higher layer processing unit 14 performs processing of the MAC layer.

The radio resource control layer processing unit 16 included in the higher layer processing unit 14 performs processing of the RRC layer. The radio resource control layer processing unit 16 manages various types of configuration information/parameters of the terminal apparatus 1. The radio resource control layer processing unit 16 sets various types of configuration information/parameters, based on a higher layer signal received from the base station apparatus 3. Namely, the radio resource control layer processing unit 16 sets the various configuration information/parameters in accordance with the information for indicating the various configuration information/parameters received from the base station apparatus 3.

The radio transmission and/or reception unit 10 performs processing of the physical layer, such as modulation, demodulation, coding, decoding, and the like. The radio transmission and/or reception unit 10 demultiplexes, demodulates, and decodes a signal received from the base station apparatus 3, and outputs the information resulting from the decoding to the higher layer processing unit 14. The radio transmission and/or reception unit 10 generates a transmit signal by modulating and coding data, and performs transmission to the base station apparatus 3.

The RF unit 12 converts (down-converts) a signal received via the antenna unit 11 into a baseband signal by orthogonal demodulation and removes unnecessary frequency components. The RF unit 12 outputs a processed analog signal to the baseband unit.

The baseband unit 13 converts the analog signal input from the RF unit 12 into a digital signal. The baseband unit 13 removes a portion corresponding to a Cyclic Prefix (CP) from the digital signal resulting from the conversion, performs Fast Fourier Transform (FFT) of the signal from which the CP has been removed, and extracts a signal in the frequency domain.

The baseband unit 13 generates an OFDM symbol by performing Inverse Fast Fourier Transform (IFFT) of the data, adds CP to the generated OFDM symbol, generates a baseband digital signal, and converts the baseband digital signal into an analog signal. The baseband unit 13 outputs the analog signal resulting from the conversion, to the RF unit 12.

The RF unit 12 removes unnecessary frequency components from the analog signal input from the baseband unit 13 using a low-pass filter, up-converts the analog signal into a signal of a carrier frequency, and transmits the up-converted signal via the antenna unit 11. The RF unit 12 amplifies power. The RF unit 12 may have a function of controlling transmit power. The RF unit 12 is also referred to as a transmit power control unit.

The terminal apparatus 1 receives the PDCCH. The radio resource control layer processing unit 16 configures the number of PDCCH candidates configured in a dedicated control resource set, based on RRC signaling. The radio resource control layer processing unit 16 configures the number of PDCCH candidates configured in the common control resource set. The receiver of the radio transmission and/or reception unit 10 monitors multiple PDCCH candidates in the dedicated control resource set. The receiver of the radio transmission and/or reception unit 10 monitors multiple PDCCH candidates in the common control resource set. The decoding unit of the physical layer processing unit of the radio transmission and/or reception unit 10 decodes the PDCCH candidates. The receiver of the radio transmission and/or reception unit 10 monitors a first number of PDCCH candidates in the dedicated control resource set in a time period (subframe or slot) in which the common control resource set is not configured. The first number is the number of PDCCH candidates configured in advance for the dedicated control resource set, based on RRC signaling. The receiver of the radio transmission and/or reception unit 10 monitors a second number of PDCCH candidates in the dedicated control resource set in a time period (subframe or slot) in which the common control resource set is configured, and monitors a third number of PDCCH candidates in the common control resource set. The third number is the number of PDCCH candidates configured in advance for the common control resource set. The sum of the second number and the third number is the first number. The sum of the second number and the third number may be less than the first number.

The receiver of the radio transmission and/or reception unit 10 monitors a first number of PDCCH candidates in the dedicated control resource set in a time period (subframe or slot) in which the common control resource set is not configured. The receiver of the radio transmission and/or reception unit 10 monitors a third number of PDCCH candidates in the common control resource set in a time period (subframe or slot) in which the common control resource set is configured. In a case that the sum of the first number and the third number does not exceed the processing capacity of the terminal apparatus 1 (in a case of not exceeding the number of PDCCH candidates indicated as the capability information), the receiver of the radio transmission and/or reception unit 10 monitors a first number of PDCCH candidates in the dedicated control resource set in a time period (subframe or slot) in which the common control resource set is configured, and in a case that the sum of the first number and the third number exceeds the processing capacity of the terminal apparatus 1 (in a case of exceeding the number of PDCCH candidates indicated as the capability information), the receiver of the radio transmission and/or reception unit 10 monitors a fourth number of PDCCH candidates less than the first number in the dedicated control resource set in the time period (subframe or slot) in which the common control resource set is configured.

An example of a configuration of the base station apparatus 3 according to one aspect of the present embodiment will be described below.

Figure 11:
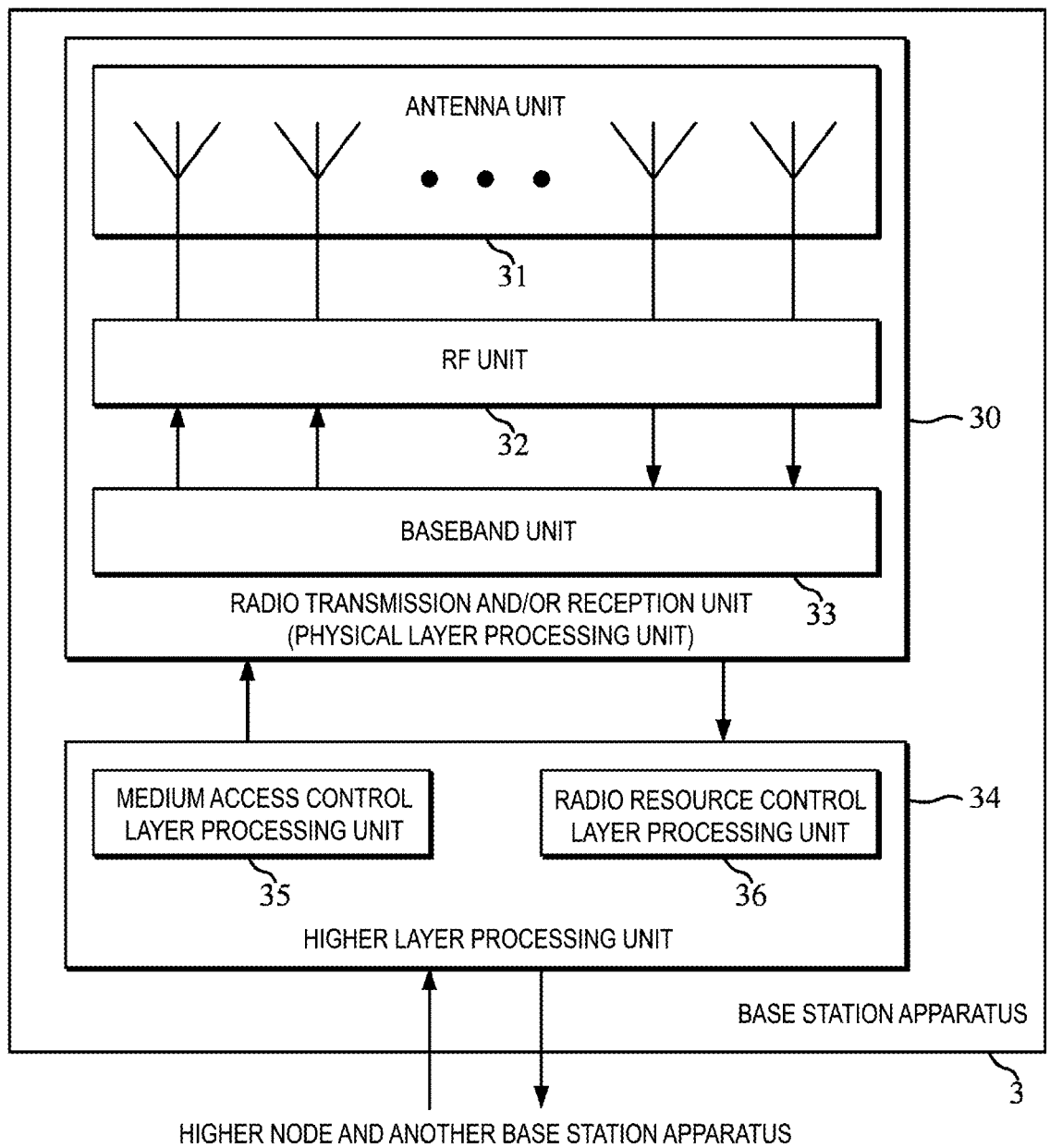
FIG. 11 is a schematic block diagram illustrating a configuration of a base station apparatus 3 according to the present embodiment.

FIG. 11 is a schematic block diagram illustrating a configuration of the base station apparatus 3 according to the present embodiment. As illustrated, the base station apparatus 3 includes a radio transmission and/or reception unit 30 and a higher layer processing unit 34. The radio transmission and/or reception unit 30 includes an antenna unit 31, an RF unit 32, and a baseband unit 33. The higher layer processing unit 34 includes a medium access control layer processing unit 35 and a radio resource control layer processing unit 36. The radio transmission and/or reception unit 30 is also referred to as a transmitter, a receiver or a physical layer processing unit.

The higher layer processing unit 34 performs processing of the MAC layer, the PDCP layer, the RLC layer, and the RRC layer.

The medium access control layer processing unit 35 included in the higher layer processing unit 34 performs processing of the MAC layer.

The radio resource control layer processing unit 36 included in the higher layer processing unit 34 performs processing of the RRC layer. The radio resource control layer processing unit 36 generates, or acquires from a higher node, downlink data (transport block) allocated on the PDSCH, system information, an RRC message, a MAC CE, and the like, and performs output to the radio transmission and/or reception unit 30. The radio resource control layer processing unit 36 manages various types of configuration information/parameters for each of the terminal apparatuses 1. The radio resource control layer processing unit 36 may set various types of configuration information/parameters for each of the terminal apparatuses 1 via higher layer signaling. That is, the radio resource control layer processing unit 36 transmits/broadcasts information for indicating various types of configuration information/parameters.

The functionality of the radio transmission and/or reception unit 30 includes the functionality similar to the radio transmission and/or reception unit 10. The radio transmission and/or reception unit 30 grasps a Search space (SS) configured for the terminal apparatus 1. The radio transmission and/or reception unit 30 includes an SS grasp unit, and the SS grasp unit grasps the SS configured for the terminal apparatus 1. The SS grasp unit grasps one or more PDCCH candidates in the control resource set configured as the Search space of the terminal apparatus. The SS grasp unit grasps the number of PDCCH candidates configured in the dedicated control resource set of the terminal apparatus 1. The SS grasp unit grasps the number of PDCCH candidates configured in the common control resource set. The SS grasp unit grasps the first number as the number of PDCCH candidates in the dedicated control resource set of the terminal apparatus 1 in the time period (subframe or slot) in which the common control resource set is not configured. The SS grasp unit grasps the second number as the number of PDCCH candidates in the dedicated control resource set of the terminal apparatus 1 in the time period (subframe or slot) in which the common control resource set is configured, and grasps the third number as the number of PDCCH candidates in the common control resource set. The sum of the second number and the third number is equal to the first number. The sum of the second number and the third number may be less than the first number. The transmitter of the radio transmission and/or reception unit 30 transmits the PDCCH by using the PDCCH candidates.

Each of the units having the reference signs 10 to 16 included in the terminal apparatus 1 may be configured as a circuit. Each of the units having the reference signs 30 to 36 included in the base station apparatus 3 may be configured as a circuit.

An example of an initial connection procedure according to the present embodiment will be described below.

The base station apparatus 3 includes a communicable range (or a communication area) controlled by the base station apparatus 3. The communicable range is divided into one or multiple cells (or serving cells, sub-cells, beams, and the like), and communications with the terminal apparatus 1 can be managed for each cell. Meanwhile, the terminal apparatus 1 selects at least one cell from the multiple cells and attempts to establish a connection with the base station apparatus 3. Here, a first state in which the connection between the terminal apparatus 1 and at least one cell of the base station apparatus 3 is established is also referred to as RRC Connection. A second state in which the terminal apparatus 1 has not established the connection with any cell of the base station apparatus 3 is also referred to as RRC idle. In addition, a third state in which the connection of the terminal apparatus 1 with at least one cell of the base station apparatus 3 is established but some functions are limited between the terminal apparatus 1 and the base station apparatus 3 is also referred to as RRC suspended. The RRC suspended is also referred to as RRC inactive.

Figure 12:
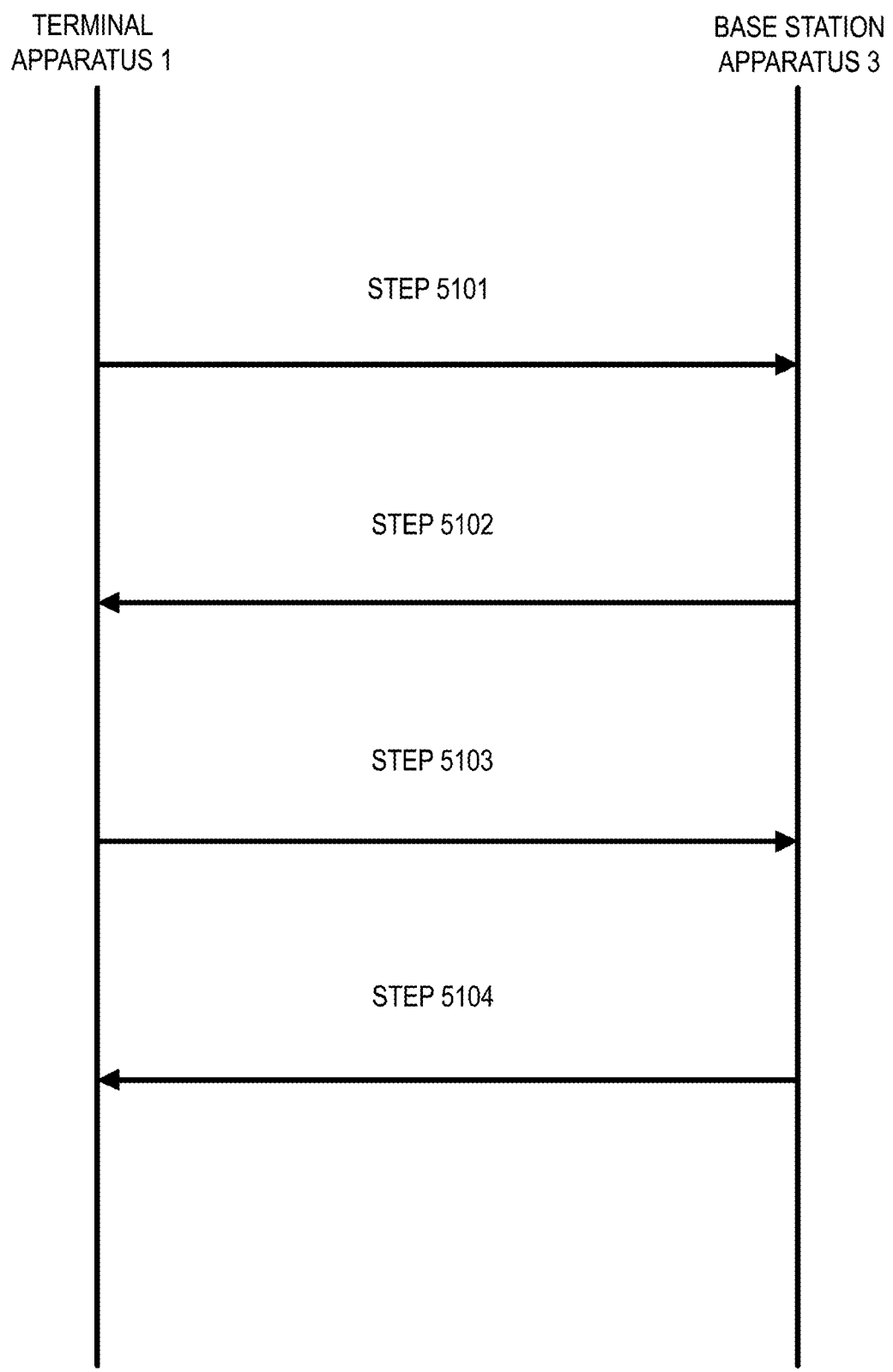
FIG. 12 is a diagram illustrating an example of a first initial connection procedure (4-step contention based RACH procedure) according to one aspect of the present embodiment.

The terminal apparatus 1 in RRC idle may attempt to establish a connection with at least one cell of the base station apparatus 3. Here, the cell to which the terminal apparatus 1 attempts to connect is also referred to as a target cell. FIG. 12 is a diagram illustrating an example of a first initial connection procedure (4-step contention based RACH procedure) according to one aspect of the present embodiment. The first initial connection procedure includes at least some of Steps 5101 to 5104.

Step 5101 is a step in which the terminal apparatus 1 requests, via a physical channel, a target cell to respond for initial connection. Alternatively, step 5101 is a step in which the terminal apparatus 1 performs initial transmission to the target cell via the physical channel. Here, the physical channel may be a PRACH, for example. The physical channel may be a channel dedicatedly used to request a response for initial connection. In step 5101, the message transmitted from the terminal apparatus 1 via the physical channel is also referred to as a random access message 1. The signal of the random access message 1 may be generated based on the random access preamble index u given by a higher layer of the terminal apparatus 1.

The terminal apparatus 1 performs downlink time-frequency synchronization prior to performing step 5101. In a first state, a synchronization signal is used for the terminal apparatus 1 to establish downlink time-frequency synchronization.

The synchronization signal may be transmitted with an ID (cell ID) of the target cell included therein. The synchronization signal may be transmitted with a sequence generated based on at least the cell ID included therein. The synchronization signal including the cell ID may mean that a sequence of synchronization signals is provided based on the cell ID. The synchronization signal may be transmitted with a beam (or precoder) applied thereto.

The beam exhibits a phenomenon that antenna gain varies according to the direction. The beam may be provided based on at least the directivity of the antenna. The beam may be provided based on at least the phase shift of the carrier signal. The beam may be provided by application of a precoder.

The terminal apparatus 1 receives the PBCH transmitted from the target cell. The PBCH may be transmitted that includes essential information block (Master Information Block (MIB) and Essential Information Block (EIB)) including the essential system information used for the connection of the terminal apparatus 1 with the target cell. The essential information block is system information. The essential information block may include information on the radio frame number. The essential information block may include information on a position in a super frame including multiple radio frames (e.g., information for indicating at least some of System Frame Numbers (SFNs) in the super frame). The PBCH may include an index of the synchronization signal. The PBCH may include information on the reception of a PDCCH. The essential information block may be mapped to a BCH in a transport channel. The essential information block may be mapped to a BCCH in a logical channel.

The information relating to reception of the PDCCH may include information for indicating a control resource set. The information for indicating the control resource set may include information relating to the number and position of PRBs to which the control resource set is mapped. The information for indicating the control resource set may include information for indicating mapping of the control resource set. The information for indicating the control resource set may include information relating to the number of OFDM symbols to which the control resource set is mapped. The information for indicating the control resource set may include information for indicating the period (periodicity) of the slot to which the control resource set is mapped. The information for indicating the control resource set may include information for indicating the position in the time domain of the subframe or the slot to which the control resource set is allocated. The terminal apparatus 1 may attempt to receive the PDCCH, based on at least the information for indicating the control resource set included in the PBCH.

The Information relating to reception of the PDCCH may include information relating to an ID for indicating the destination of the PDCCH. The ID for indicating the destination of the PDCCH may be an ID used for scrambling the CRC-bits to be added to the PDCCH. The ID for indicating the destination of the PDCCH is also referred to as a Radio Network Temporary Identifier (RNTI). Information relating to the ID used for scrambling the CRC bits added to the PDCCH may be included. The terminal apparatus 1 may attempt to receive the PDCCH, based on at least the information relating to the ID included in the PBCH.

The RNTI may include a System Information-RNTI (SI-RNTI), a Paging-RNTI (a P-RNTI), a Common RNTI (C-RNTI), a Temporary C-RNTI, and a Random Access-RNTI (RA-RNTI). The SI-RNTI is used at least for scheduling the PDSCH transmitted with system information included therein. The P-RNTI is used at least for scheduling the PDSCH transmitted with paging information and/or information such as notification of change of the system information included therein. The C-RNTI is used at least for scheduling user data to the terminal apparatus 1 in RRC connection. The Temporary C-RNTI is used at least for scheduling a random access message 4. The Temporary C-RNTI is used at least for scheduling of the PDSCH including data to be mapped to a CCCH in the logical channel. The RA-RNTI is used at least for scheduling of the random access message 2.

A common control resource set in which the PDSCH including resource allocation information of the PDSCH to be used for transmission and/or reception of System information (Remeining Minimum System Information (RMSI), Other System Information (OSI)) is transmitted and/or received may be allocated in association with the synchronization signal. The common control resource set may be allocated in a subframe same as or close to the time domain in which the synchronization signal is allocated.

The information relating to reception of the PDCCH may include information relating to an aggregation level of the search space included in the control resource set. The terminal apparatus 1 may identify the aggregation level of PDCCH candidates whose reception should be attempted and determine the search space, based on at least the information relating to the aggregation level of the search space included in the control resource set included in the PBCH.

The information on the reception of the PDCCH may include information on the REG group. The information on the reception of the PDCCH may include information for indicating the number of REGs constituting the REG group in the frequency domain. The information on the reception of the PDCCH may include information for indicating the number of REGs constituting the REG group in the time domain.

The reference signals corresponding to the control resource set may correspond to multiple PDCCH candidates included in the control resource set. The reference signals corresponding to the control resource set may be used for demodulation of the multiple PDCCHs included in the control resource set.

The base station apparatus 3 can transmit the PBCH including information on the reception of the PDCCH and indicate monitoring of a common control resource set (first control resource set) to the terminal apparatus 1. The terminal apparatus 1 monitors the common control resource set, based on at least detecting of information relating to reception of the PDCCH included in the PBCH. The common control resource set is used at least for scheduling of the first system information (RMSI, OSI). The first system information may include system information important for the terminal apparatus 1 to connect to the target cell. The first system information may include information on various configurations of downlink. The first system information may include information on various configurations of PRACH. The first system information may include information on various configurations of uplink. The first system information may include information of a signal waveform (OFDM or DFT-s-OFDM) configured for random access message 3 transmission. The first system information may include at least a part of the system information other than information included in the MIB. The first system information may be mapped to the BCH in the transport channel. The first system information may be mapped to the BCCH in the logical channel. The first system information may include at least System Information Block type 1 (SIB1). The first system information may include at least System Information Block type 2 (SIB2). The common control resource set may be used for scheduling the random access message 2. The SIB1 may include information relating to a measurement required to perform RRC connection. The SIB2 may include information relating to a channel which is common and/or shared among multiple terminal apparatuses 1 in a cell.

The terminal apparatus 1 may monitor the PDCCH, based on at least the information on the reception of the PDCCH. The terminal apparatus 1 may monitor the PDCCH, based on at least the information on the REG group. The terminal apparatus 1 may assume the configuration applied for monitoring the PDCCH, based on at least the information on the reception of the PDCCH.

The base station apparatus 3 can transmit the MIB and/or the first system information and indicate the monitoring of the common control resource set to the terminal apparatus 1. The first system information may include the information on the reception of the PDCCH. The terminal apparatus 1 monitors the common control resource set, based on at least the MIB and/or the information on the reception of the PDCCH included in the first system information. The common control resource set may be used for scheduling of the PDSCH including the paging information and/or the information for the change notification of system information.

Step 5102 is a step in which the base station apparatus 3 performs a response to the random access message 1 from the terminal apparatus 1. The response is also referred to as the random access message 2. The random access message 2 may be transmitted via the PDSCH. The PDSCH including the random access message 2 is scheduled by the PDCCH. The CRC bits included in the PDCCH may be scrambled by the RA-RNTI. The random access message 2 may be transmitted with a special uplink grant included therein. The special uplink grant is also referred to as a random access response grant. The special uplink grant may be included in the PDSCH including the random access message 2. The random access response grant may include at least a Temporary C-RNTI.

The base station apparatus 3 can transmit the MIB, the first system information, and/or the second system information, and indicate monitoring of the common control resource set to the terminal apparatus 1. The second system information may include the information on the reception of the PDCCH. The terminal apparatus 1 monitors the common control resource set, based on at least the MIB, and the information on the reception of the PDCCH included in the first system information and/or the second system information. The number of CRC bits added to the PDCCH may be scrambled with Temporary C-RNTI. The common control resource set may be used for scheduling the random access message 2.

The common control resource set may be further given based on at least the physical root index u included in the random access message 1 transmitted from the terminal apparatus 1 and/or a resource (PRACH resource) used for transmission of the random access message 1. Here, the random access message 1 may correspond to the monitoring of the fourth control resource set. The resource may indicate a resource of a time and/or a frequency. The resource may be given by an index of a resource block and/or an index of a slot (subframe). The monitoring of the common control resource set may be triggered by the random access message 1.

Step 5103 is a step in which the terminal apparatus 1 transmits, to the target cell, a request for RRC connection. The request for RRC connection is also referred to as a random access message 3. The random access message 3 may be transmitted via the PUSCH scheduled by the random access response grant. The random access message 3 may include an ID used to identify the terminal apparatus 1. The ID may be an ID managed in a higher layer. The ID may be an SAE Temporary Mobile Subscriber Identity (S-TMSI). The ID may be mapped to the CCCH in the logical channel.

Step 5104 is a step in which the base station apparatus 3 transmits Contention resolution message to the terminal apparatus 1. The contention resolution message is also referred to as the random access message 4. The terminal apparatus 1, after transmitting the random access message 3, monitors the PDCCH that performs scheduling of the PDSCH including the random access message 4. The random access message 4 may include a contention avoidance ID. Here, the contention avoidance ID is used to resolve a contention in which multiple terminal apparatuses 1 transmit signals by using a same radio resource. The contention avoidance ID is also referred to as UE contention resolution identity.

In step 5104, the terminal apparatus 1 which has transmitted the random access message 3 including the ID used for identifying the terminal apparatus 1 (S-TMSI, for example) monitors the random access message 4 including the Contention resolution message. In a case that the contention avoidance ID included in the random access message 4 is identical to the ID used to identify the terminal apparatus 1, the terminal apparatus 1 may consider that the contention resolution has been successfully completed, and set the value of the Temporary C-RNTI in the C-RNTI field. The terminal apparatus 1 having the value of the Temporary C-RNTI set in the C-RNTI field is considered to have completed an RRC connection.

The control resource set to monitor the PDCCH for scheduling of the random access message 4 may be the common control resource set. The base station apparatus 3 can transmit the information on the reception of PDCCH included in the random access message 2 and indicate the monitoring of the common control resource set to the terminal apparatus 1. The terminal apparatus 1 monitors the PDCCH, based on at least the information relating to reception of the PDCCH included in the random access message 2.

The terminal apparatus 1 in RRC connection can receive dedicated RRC signaling mapped to the DCCH in the logical channel. The base station apparatus 3 can transmit the dedicated RRC signaling including the information on the reception of the PDCCH and indicate the monitoring of a dedicated control resource set (the second control resource set) to the terminal apparatus 1. The terminal apparatus 1 monitors the PDCCH, based on at least the information on the reception of the PDCCH included in the dedicated RRC signaling.

The base station apparatus 3 can transmit the random access message 4 including the information on the reception of the PDCCH, and indicate the monitoring of a dedicated control resource set to the terminal apparatus 1. In a case that the random access message 4 includes the information on the reception of the PDCCH, the terminal apparatus 1 may monitor the dedicated control resource set, based on at least the information on the reception of the PDCCH.

Figure 13:
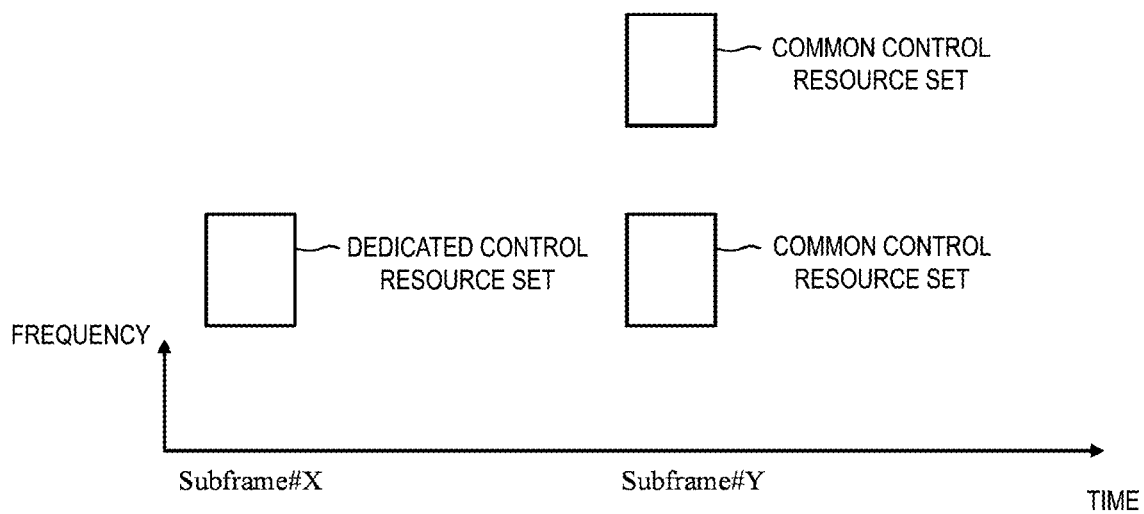
FIG. 13 is a diagram illustrating an example of PDCCH candidates monitored by the terminal apparatus 1 according to one aspect of the present embodiment.

FIG. 13 is a diagram illustrating an example of PDCCH candidates monitored by the terminal apparatus 1 according to one aspect of the present embodiment. FIG. 13(a) illustrates an example of PDCCH candidates for the dedicated control resource set (Dedicated CORESET, UE-specific CORESET) configured based on RRC signaling. FIG. 13(a) also means an example of PDCCH candidates of the USS configured based on RRC signaling. In FIG. 13(a), an example is illustrated in which six PDCCH candidates with the aggregation level of 1, six PDCCH candidates with the aggregation level of 2, two PDCCH candidates with the aggregation level of 4, and two PDCCH candidates with the aggregation level of 8 are configured. FIG. 13(b) illustrates an example of PDCCH candidates for the common control resource set (Common CORESET). FIG. 13(b) also means an example of PDCCH candidates of the CSS. In FIG. 13(b), an example is illustrated in which four PDCCH candidates with the aggregation level of 4, and two PDCCH candidates with the aggregation level of 8 are configured. FIG. 13(c) illustrates an example of an allocation of control resource sets. In the Subframe #X (first time period), only a dedicated control resource set is allocated for a certain terminal apparatus 1. In the Subframe #X, as illustrated in FIG. 13(a), the terminal apparatus 1 monitors the total of 16 (first number of) PDCCH candidates in the dedicated control resource set. In the Subframe #Y (second time period), a dedicated control resource set and a common control resource set are allocated for a certain terminal apparatus 1. As illustrated in FIG. 13(b), the terminal apparatus 1 monitors the total of six (third number of) PDCCH candidates in the common control resource set, and monitors the total of 10 (second number of) PDCCH candidates in the dedicated control resource set. Here, the sum of six PDCCH candidates in the common control resource set at the Subframe #Y and 10 PDCCH candidates in the dedicated control resource set at the Subframe #Y is equal to 16 PDCCH candidates in the dedicated control resource set at the Subframe #X.

For example, in the Subframe #Y, in the dedicated control resource set of the terminal apparatus 1, three PDCCH candidates with the aggregation level of 1, three PDCCH candidates with the aggregation level of 2, two PDCCH candidates with the aggregation level of 4, and two PDCCH candidates with the aggregation level of 8 may be configured. The configuration of the PDCCH candidates of the dedicated control resource sets configured by RRC signaling is adjusted in the subframe in which the common control resource set is configured such that the total number of times of the blind decoding detection (blind detection) is constant regardless of whether the common control resource set is configured in the subframe or the shared control resource set is not configured in the subframe.

Thus, rather than independently configuring the PDCCH candidates for the common control resource set and the dedicated control resource set, by adjusting the number of PDCCH candidates of the dedicated control resource set so as to make the total number of PDCCH candidates to be processed in the subframe to be constant, efficient PDCCH reception processing can be achieved without increasing the processing load of the terminal apparatus 1. In a case that the processing capacity of blind decoding detection of PDCCH candidates is allocated fixedly for a common control resource set, the processing capacity cannot be efficiently used in a subframe in which there is no common control resource set. In a case that the number of PDCCH candidates in the dedicated control resource set is reduced, overlap of PDCCH candidates occurs between different terminal apparatuses 1, and the scheduling flexibility degrades. By efficiently using the processing capacity of the blind decoding detection of PDCCH in a subframe in which there is no common control resource set, and increasing the number of PDCCH candidates in the dedicated control resource set, the scheduling flexibility can be improved. The base station apparatus 3 grasps the number of PDCCH candidates to be adjusted in the dedicated control resource set in the terminal apparatus 1, and transmits the PDCCH to the terminal apparatus 1 by using any of the PDCCH candidates grasped.

The terminal apparatus 1 defines the number of PDCCH candidates that can be processed in a subframe as the upper limit of processing capacity. The terminal apparatus 1 transmits/reports information indicating the upper limit value of PDCCH candidates that can be processed as UE capability information to the base station apparatus 3. For example, in a case that the system bandwidth is small, in a case that many terminal apparatuses 1 are located in an area managed by the base station apparatus 3, and the like, the base station apparatus 3 may configure the dedicated control resource set constituted by fewer resources for the terminal apparatus 1. In the dedicated control resource set including fewer resources, a fewer number of CCEs are configured due to physical resource constraints, and this results in a fewer number of PDCCH candidates that can be configured. The number of PDCCH candidates configured based on RRC signaling may be less than the number of PDCCH candidates that can be processed as the capability of the terminal apparatus 1. For example, the number of PDCCH candidates that can be processed as the processing capacity of the terminal apparatus 1 is 20, the number of PDCCH candidates in the control dedicated resource set configured by RRC signaling is 14 (first number), and the number of PDCCH candidates in the common control resource set is six (third number). As illustrated in FIG. 13(c), in the Subframe #Y in which the common control resource is configured, the terminal apparatus 1 monitors the first number (14) of PDCCH candidates in the dedicated control resource set in the Subframe #Y, with the sum of the first number (14) and the third number (six) not exceeding the processing capacity (20) of the terminal apparatus 1. For example, the number of PDCCH candidates that can be processed as the processing capacity of the terminal apparatus 1 is 20, the number of PDCCH candidates in the control dedicated resource set configured by RRC signaling is 16 (first number), and the number of PDCCH candidates in the common control resource set is six (third number). As illustrated in FIG. 13(c), in the Subframe #Y in which the common control resource is configured, the sum of the first number (16) and the third number (six) exceeds the processing capacity (20) of the terminal apparatus 1, so the terminal apparatus 1 monitors a fourth number (14) of PDCCH candidates less than the first number in the dedicated control resource set in the Subframe #Y.

Multiple BandWidth Parts (BWPs) may be configured for the terminal apparatus 1, and the common control resource set and the dedicated control resource set may be configured for different BWPs. The "BWP" refers to a frequency bandwidth of a portion of a carrier (cell), and is used to limit the frequency bandwidth used by the terminal apparatus 1 for communication.

The present invention may also be applied to a common control resource set in which a PDCCH including information for indicating empty resources (Preemption indication) is transmitted and/or received. The present invention may also be applied to a common control resource set in which a PDCCH including information for indicating reserved resources is transmitted and/or received. The present invention may also be applied to a common control resource set in which a PDCCH including information for indicating a slot format configuration (Slot Format Indication (SFI)) is transmitted and/or received.

As described above, by taking into account the processing capacity of the terminal apparatus 1, adjusting the PDCCH candidates in the dedicated control resource set in the subframe in which the common control resource set is configured, and by ensuring that the number of PDCCH candidates in the dedicated control resource set for which the terminal apparatus 1 performs blind decoding detection is not reduced as much as possible, it is possible to suppress degradation of the scheduling flexibility of PDCCH.

Various aspects of apparatuses according to one aspect of the present embodiment will be described below.

(1) To accomplish the object described above, aspects of the present invention are contrived to provide the following measures. Specifically, a first aspect of the present invention is a terminal apparatus for receiving a PDCCH, the terminal apparatus including: a radio resource control layer processing unit configured to configure the number of PDCCH candidates configured in a dedicated control resource set, based on RRC signaling; a receiver configured to monitor the multiple PDCCH candidates in the dedicated control resource set; and a decoding unit configured to decode the PDCCH candidates. The terminal apparatus monitors a first number of PDCCH candidates in the dedicated control resource set in a time period in which a common control resource set is not configured, monitors a second number of PDCCH candidates in the dedicated control resource set in a time period in which the common control resource set is configured, and monitors a third number of PDCCH candidates in the common control resource set. A sum of the second number and the third number is equal to the first number.

(2) A second aspect of the present invention is a communication method used for a terminal apparatus for receiving a PDCCH, the communication method including the steps of: configuring the number of PDCCH candidates configured in a dedicated control resource set, based on RRC signaling; monitoring the multiple PDCCH candidates in the dedicated control resource set; and decoding the PDCCH candidates. The communication method monitors a first number of PDCCH candidates in the dedicated control resource set in a time period in which a common control resource set is not configured, monitors a second number of PDCCH candidates in the dedicated control resource set in a time period in which the common control resource set is configured, and monitors a third number of PDCCH candidates in the common control resource set. A sum of the second number and the third number is equal to the first number.

(3) A third aspect of the present invention is a base station apparatus for transmitting a PDCCH, the base station apparatus including: a SS grasp unit configured to grasp one or more PDCCH candidates in a control resource set, configured as a search space of a terminal apparatus; and a transmitter configured to transmit the PDCCH by using the PDCCH candidates. The base station apparatus grasps a first number as the number of PDCCH candidates in a dedicated control resource set of the terminal apparatus in a time period in which a common control resource set is not configured, grasps a second number as the number of PDCCH candidates in the dedicated control resource set of the terminal apparatus in a time period in which the common control resource set is configured, and grasps a third number as the number of the PDCCH candidates in the common control resource set. A sum of the second number and the third number is equal to the first number.

(4) A fourth aspect of the present invention is a communication method used for a base station apparatus for transmitting a PDCCH, the communication method including the steps of: grasping one or more PDCCH candidates in a control resource set, configured as a Search space of a terminal apparatus; and transmitting the PDCCH by using the PDCCH candidates. The communication method includes grasping a first number as the number of PDCCH candidates in a dedicated control resource set of the terminal apparatus in a time period in which a common control resource set is not configured, grasping a second number as the number of PDCCH candidates in the dedicated control resource set of the terminal apparatus in a time period in which the common control resource set is configured, and grasping a third number as the number of the PDCCH candidates in the common control resource set. A sum of the second number and the third number is equal to the first number.

(5) A fifth aspect of the present invention is a terminal apparatus for receiving a PDCCH, the terminal apparatus including: a radio resource control layer processing unit configured to configure a number of PDCCH candidates configured in a dedicated control resource set, based on RRC signaling; and a receiver configured to monitor the multiple PDCCH candidates in the dedicated control resource set. The terminal apparatus monitors a first number of PDCCH candidates in the dedicated control resource set in a time period in which a common control resource set is not configured, monitors a third number of PDCCH candidates in the common control resource set in a time period in which the common control resource set is configured, monitors a first number of PDCCH candidates in the dedicated control resource set in a time period in which the common control resource set is configured in a case that a sum of the first number and the third number does not exceed a processing capacity of the terminal apparatus, and monitors a fourth number of PDCCH candidates less than the first number in the dedicated control resource set in a time period in which the common control resource set is configured in a case that a sum of the first number and the third number exceeds the processing capacity of the terminal apparatus.

(6) A sixth aspect of the present invention is a communication method used for a terminal apparatus for receiving a PDCCH, the communication method including the steps of: configuring a number of PDCCH candidates configured in a dedicated control resource set, based on RRC signaling; and monitoring the multiple PDCCH candidates in the dedicated control resource set. The communication method includes monitoring a first number of PDCCH candidates in the dedicated control resource set in a time period in which a common control resource set is not configured, monitoring a third number of PDCCH candidates in the common control resource set in a time period in which the common control resource set is configured, monitoring a first number of PDCCH candidates in the dedicated control resource set in a time period in which the common control resource set is configured in a case that a sum of the first number and the third number does not exceed a processing capacity of the terminal apparatus, and monitoring a fourth number of PDCCH candidates less than the first number in the dedicated control resource set in a time period in which the common control resource set is configured in a case that a sum of the first number and the third number exceeds the processing capacity of the terminal apparatus.

Each of a program running on the base station apparatus 3 and the terminal apparatus 1 according to the present invention may be a program that controls a Central Processing Unit (CPU) and the like, such that the program causes a computer to operate in such a manner as to realize the functions of the above-described embodiment according to the present invention. The information handled in these devices is temporarily stored in a Random Access Memory (RAM) while being processed. Thereafter, the information is stored in various types of Read Only Memory (ROM) such as a Flash ROM and a Hard Disk Drive (HDD), and when necessary, is read by the CPU to be modified or rewritten.

Note that the terminal apparatus 1 and the base station apparatus 3 according to the above-described embodiment may be partially achieved by a computer. In that case, this configuration may be realized by recording a program for realizing such control functions on a computer-readable recording medium and causing a computer system to read the program recorded on the recording medium for execution.

Note that it is assumed that the "computer system" mentioned here refers to a computer system built into the terminal apparatus 1 or the base station apparatus 3, and the computer system includes an OS and hardware components such as a peripheral apparatus. Furthermore, the "computer-readable recording medium" refers to a portable medium such as a flexible disk, a magneto-optical disk, a ROM, a CD-ROM, and the like, and a storage apparatus such as a hard disk built into the computer system.

Moreover, the "computer-readable recording medium" may include a medium that dynamically retains a program for a short period of time, such as a communication line that is used to transmit the program over a network such as the Internet or over a communication line such as a telephone line, and may also include a medium that retains a program for a fixed period of time, such as a volatile memory within the computer system for functioning as a server or a client in such a case. Furthermore, the program may be configured to realize some of the functions described above, and also may be configured to be capable of realizing the functions described above in combination with a program already recorded in the computer system.

Furthermore, the base station apparatus 3 according to the above-described embodiment may be achieved as an aggregation (apparatus group) including multiple apparatuses. Each of the apparatuses constituting such an apparatus group may include some or all portions of each function or each functional block of the base station apparatus 3 according to the above-described embodiment. The apparatus group is required to have each general function or each functional block of the base station apparatus 3. Furthermore, the terminal apparatus 1 according to the above-described embodiment can also communicate with the base station apparatus as the aggregation.

Furthermore, the base station apparatus 3 according to the above-described embodiment may serve as an Evolved Universal Terrestrial Radio Access Network (EUTRAN). Furthermore, the base station apparatus 3 according to the above-described embodiment may have some or all portions of the functions of a node higher than an eNodeB.

Furthermore, some or all portions of each of the terminal apparatus 1 and the base station apparatus 3 according to the above-described embodiment may be typically achieved as an LSI which is an integrated circuit or may be achieved as a chip set. The functional blocks of each of the terminal apparatus 1 and the base station apparatus 3 may be individually achieved as a chip, or some or all of the functional blocks may be integrated into a chip. Furthermore, a circuit integration technique is not limited to the LSI, and may be realized with a dedicated circuit or a general-purpose processor. Furthermore, in a case where with advances in semiconductor technology, a circuit integration technology with which an LSI is replaced appears, it is also possible to use an integrated circuit based on the technology.

Furthermore, according to the above-described embodiment, the terminal apparatus has been described as an example of a communication apparatus, but the present invention is not limited to such a terminal apparatus, and is applicable to a terminal apparatus or a communication apparatus of a fixed-type or a stationary-type electronic apparatus installed indoors or outdoors, for example, such as an Audio-Video (AV) apparatus, a kitchen apparatus, a cleaning or washing machine, an air-conditioning apparatus, office equipment, a vending machine, and other household apparatuses.

The embodiments of the present invention have been described in detail above referring to the drawings, but the specific configuration is not limited to the embodiments and includes, for example, an amendment to a design that falls within the scope that does not depart from the gist of the present invention. Various modifications are possible within the scope of the present invention defined by claims, and embodiments that are made by suitably combining technical means disclosed according to the different embodiments are also included in the technical scope of the present invention. Furthermore, a configuration in which constituent elements, described in the respective embodiments and having mutually the same effects, are substituted for one another is also included in the technical scope of the present invention.

CROSS-REFERENCE OF RELATED APPLICATION

This application claims the benefit of priority to JP 2017-177646 filed on Sep. 15, 2017, which is incorporated herein by reference in its entirety.

REFERENCE SIGNS LIST 1 (1A, 1B, 1C) Terminal apparatus
3 Base station apparatus
10, 30 Radio transmission and/or reception unit
11, 31 Antenna unit
12, 32 RF unit
13, 33 Baseband unit
14, 34 Higher layer processing unit
15, 35 Medium access control layer processing unit
16, 36 Radio resource control layer processing unit

The invention claimed is:
1. A terminal apparatus comprising:
a receiver configured to receive, using Radio Resource Control (RRC) signaling, a first number of Physical Downlink Control CHannel (PDCCH) candidates con- figured for at least one User Equipment-specific (UE-specific) Search Space in a slot, a position of resource blocks for each UE-specific Search Space in the slot, a second number of PDCCH candidates configured for at least one Common Search Space in the slot, and a position of resource blocks for each Common Search Space in the slot; and a processor configured to adjust the number of PDCCH candidates to be monitored in all the UE-specific Search Spaces in the slot in a case that a sum of i) the number of PDCCH candidates configured for all the UE-specific Search Spaces in the slot based on the first number and ii) the number of PDCCH candidates configured for all the Common Search Spaces in the slot based on the second number is more than a maximum number of PDCCH candidates in the slot.

2. The terminal apparatus according to claim 1, wherein the number of the PDCCH candidates to be monitored in all the Common Search Spaces in the slot is less than the maximum number in the slot.

3. The terminal apparatus according to claim 1, wherein in a case that the at least one UE-specific Search Space and the at least one Common Search Space are configured in a first slot, and a sum of i) the number of PDCCH candidates configured for all the UE-specific Search Spaces in the first slot based on the first number and ii) the number of PDCCH candidates configured for all the Common Search Spaces in the first slot based on the second number is more than a maximum number of PDCCH candidates in the first slot:

the processor adjusts the number of PDCCH candidates to be monitored in all the UE-specific Search Spaces in the first slot based on the number of PDCCH candidates configured for all the UE-specific Search Spaces in the first slot based on the first number, the number of PDCCH candidates configured for all the Common Search Spaces in the first slot based on the second number, and the maximum number in the first slot, and in a case that the at least one UE-specific Search Space is configured and the Common Search Space is not configured in a second slot:

the processor uses the number of PDCCH candidates configured for all the UE-specific Search Spaces in the second slot based on the first number as the number of PDCCH candidates to be monitored in all the UE-specific Search Spaces in the second slot.

4. The terminal apparatus according to claim 3, wherein the first slot and the second slot are configured in a same component carrier.

5. A communication method for a terminal apparatus, the communication method comprising the steps of:

receiving, using Radio Resource Control (RRC) signaling, a first number of Physical Downlink Control CHannel (PDCCH) candidates configured for at least one User Equipment-specific (UE-specific) Search Space in a slot, a position of resource blocks for each UE-specific Search Space in the slot, a second number of PDCCH candidates configured for at least one Common Search Space in the slot, and a position of resource blocks for each Common Search Space in the slot; and adjusting the number of PDCCH candidates to be monitored in all the UE-specific Search Spaces in the slot in a case that a sum of i) the number of PDCCH candidates configured for all the UE-specific Search Spaces in the slot based on the first number and ii) the number of PDCCH candidates configured for all the Common Search Spaces in the slot based on the second number is more than a maximum number of PDCCH candidates in the slot.

* * * * *